United States Patent [19]

Fukuda et al.

[11] Patent Number: 4,779,087
[45] Date of Patent: Oct. 18, 1988

[54] LOOP TRANSMISSION SYSTEM WITH FRAME SYNCHRONIZATION CONTROL

[75] Inventors: Haruki Fukuda, Tokyo; Kenshi Tazaki, Kashiwa; Masahiro Matsuda; Tomohiki Awazu, both of Kawasaki, all of Japan

[73] Assignee: Fujitsu Limited, Kawasaki, Japan

[21] Appl. No.: 938,193

[22] PCT Filed: Feb. 13, 1986

[86] PCT No.: PCT/JP86/00062

§ 371 Date: Dec. 11, 1986

§ 102(e) Date: Dec. 11, 1986

[87] PCT Pub. No.: WO86/05053

PCT Pub. Date: Aug. 28, 1986

[30] Foreign Application Priority Data

Feb. 20, 1985 [JP] Japan .................. 60-031911
Jul. 26, 1985 [JP] Japan .................. 60-163869
Feb. 13, 1986 [JP] Japan .................. 60-025818

[51] Int. Cl.⁴ .................. H04L 7/00; H04L 11/16; H04J 3/06
[52] U.S. Cl. .................. 340/825.05; 340/825.2; 340/825.14; 370/86; 370/100; 375/107
[58] Field of Search .................. 340/825.05, 825.06, 340/825.14, 825.2; 370/86, 100; 375/107, 109

[56] References Cited

U.S. PATENT DOCUMENTS

| 4,042,783 | 8/1977 | Gindi .................. 370/86 |
| 4,306,304 | 12/1981 | Baxter et al. .................. 370/86 |
| 4,334,305 | 6/1982 | Girardi .................. 370/86 |
| 4,417,242 | 11/1983 | Bapst et al. .................. 340/825.05 |
| 4,468,734 | 8/1984 | Lanier et al. .................. 364/200 |
| 4,596,025 | 6/1986 | Satoh .................. 370/100 |
| 4,623,884 | 11/1986 | Ihara et al. .................. 340/825.05 |

FOREIGN PATENT DOCUMENTS 0060307 9/1982 European Pat. Off. .

OTHER PUBLICATIONS

*IEEE Global Telecommunications Conference;* vol. 1; 11/28/83 to 12/1/83; "Synchronization Design Criteria for a Token Ring", H. Meyr et al.; pp. 13.4.1–13.4.9.

*Primary Examiner*—Robert L. Griffin
*Assistant Examiner*—Ralph E. Smith
*Attorney, Agent, or Firm*—Staas & Halsey

[57] ABSTRACT

A loop transmission system with frame synchronization control includes a loop (1) through which information in the form of a sequence of frames is transmitted, a plurality of node units (51, 52, ..., 5n; 3, 4) inserted at predetermined positions in the loop (1) for receiving and delivering information, and a supervisory device (2) inserted at a predetermined position in the loop (1) for supervising the transmission of information through the loop (1) in association with the node units (51, 52, ..., 5n; 3, 4). The supervisory device (2) is operable to deliver a frame synchronization cancellation signal. Each of the node units (51, 52, ..., 5n; 3, 4) is adapted to detect the frame synchronization cancellation signal and cancel the synchronized operation state in bypassing or taking-in of a node and to restore synchronization in the frame next to the synchronization cancelled frame. Therefore, quick restoration of synchronization after bypassing or taking-in of a node is ensured.

10 Claims, 27 Drawing Sheets

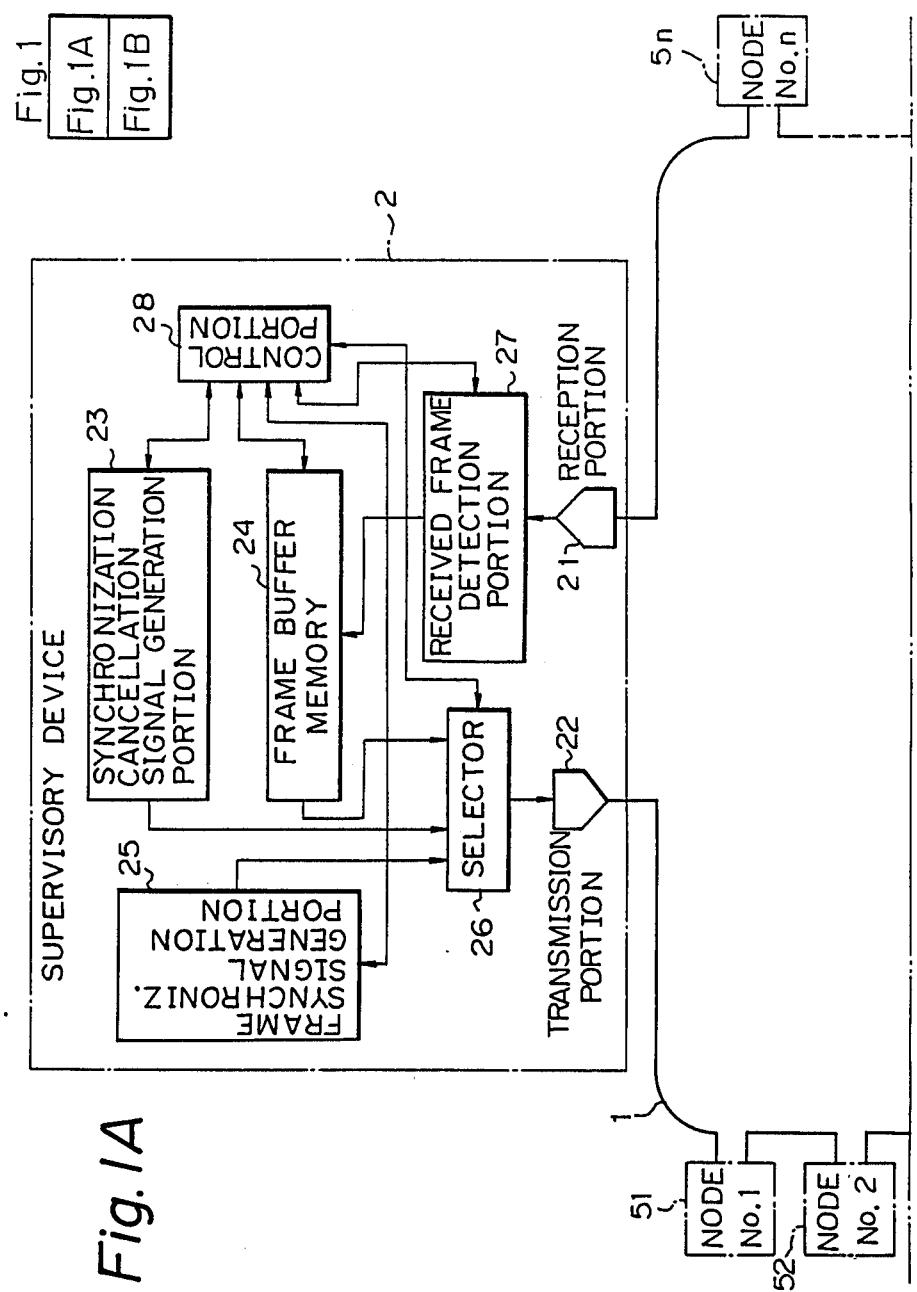

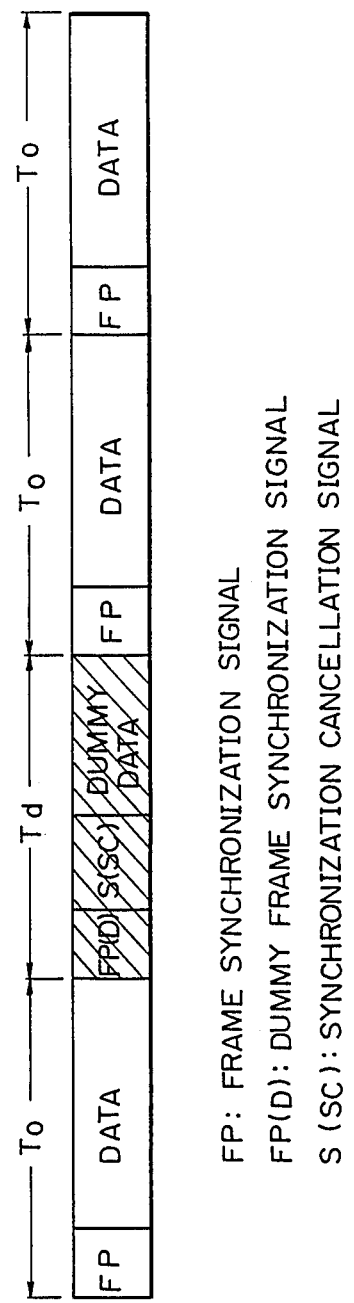

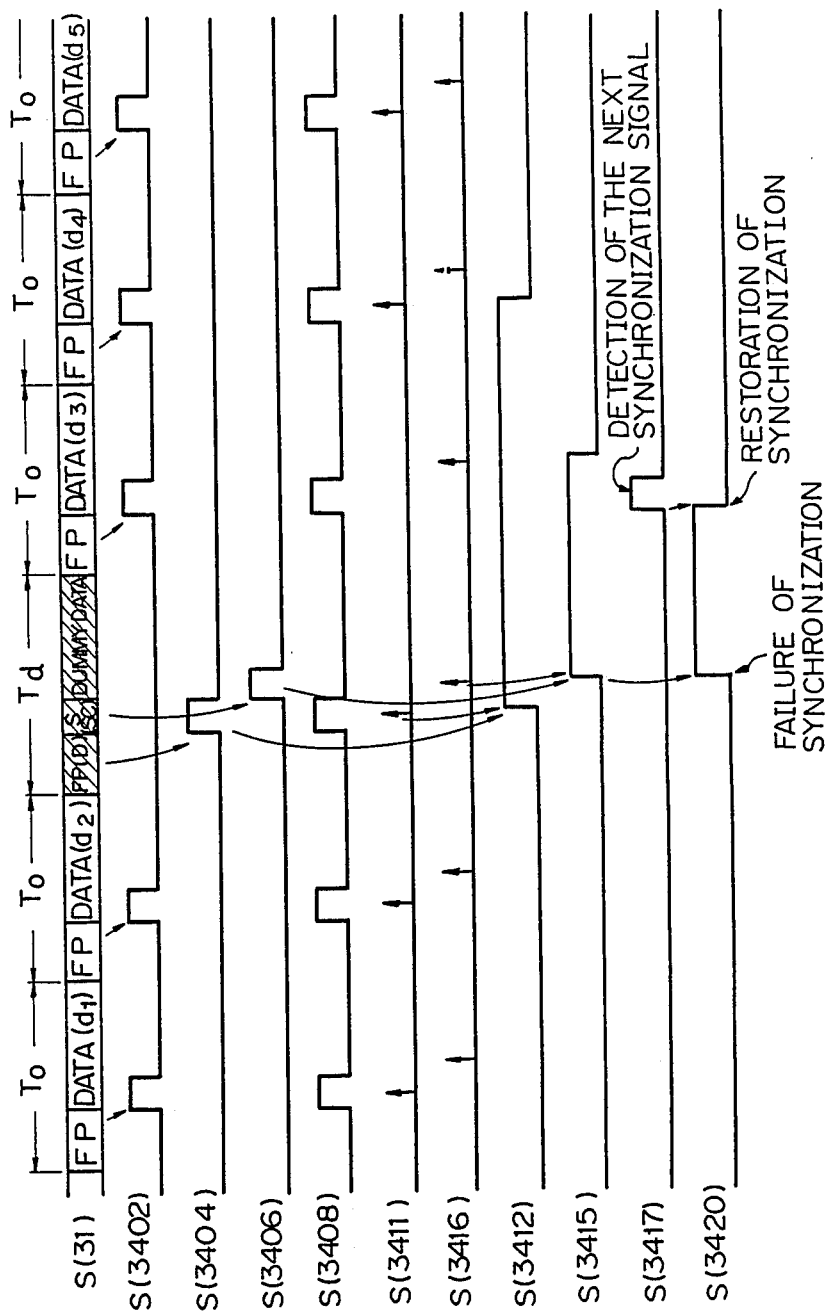

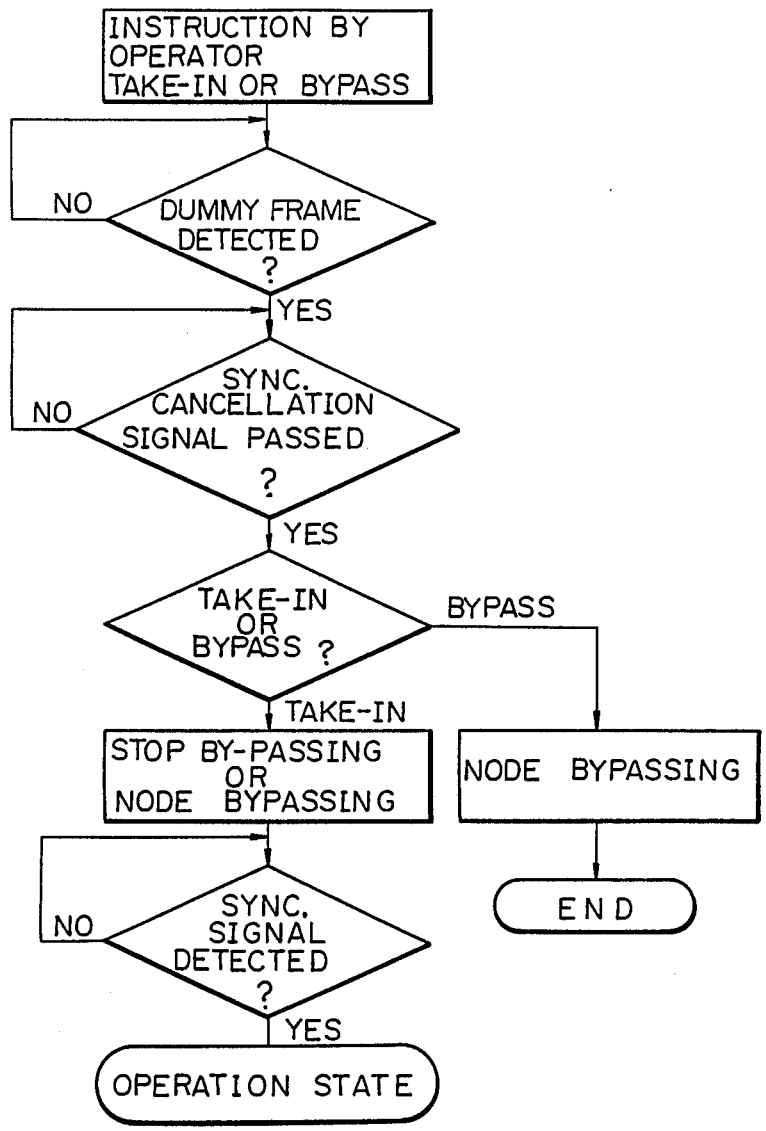

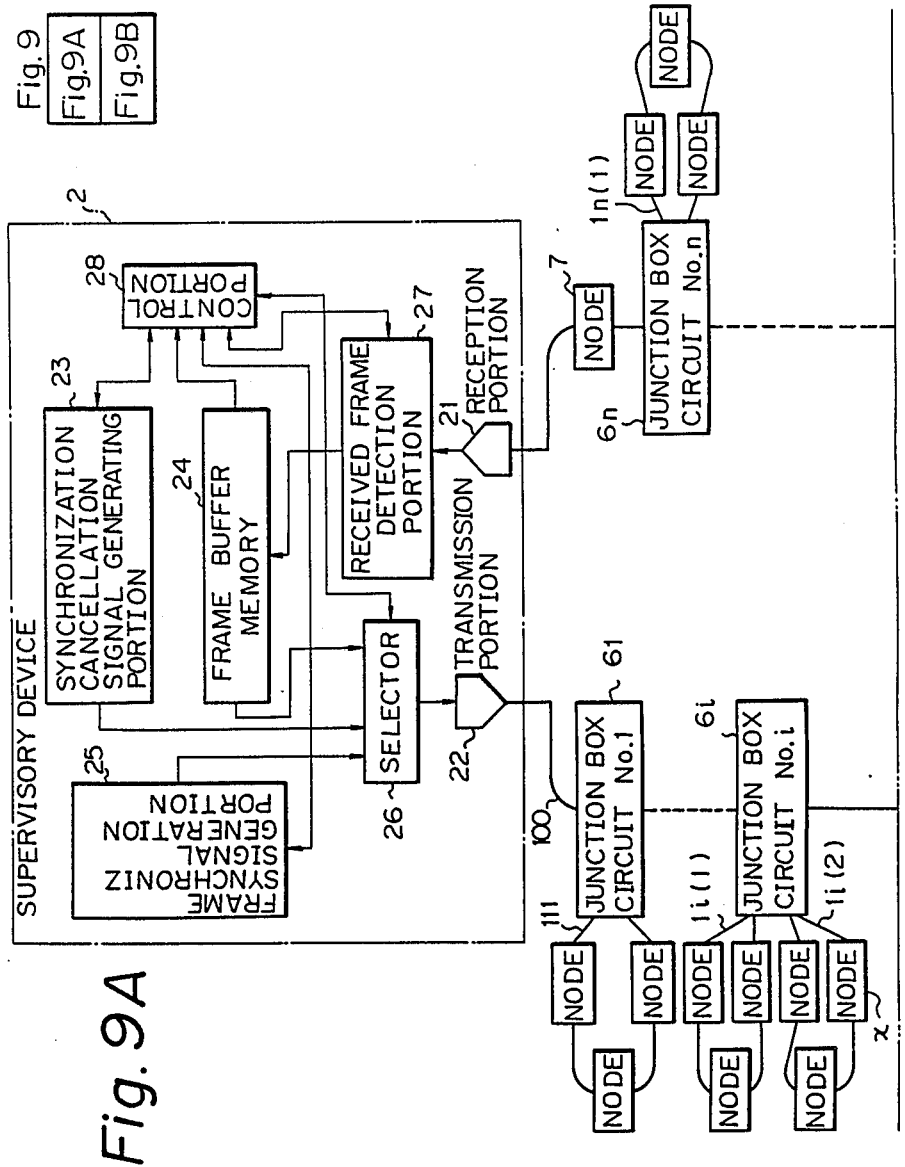

PROCESS-1: INITIAL STATE

PROCESS-2: DELIVER DUMMY FRAME

PROCESS-3: BYPASS SUB-LOOP, NODE POWER SOURCE IS OFF

PROCESS-4: BYPASS SUB-LOOP, FBM BUFFER AMOUNT IS INCREASED

PROCESS-5: ELIMINATE DUMMY FRAME

PROCESS-6: DETECT EXCESS BEYOND ONE FRAME LENGTH,
INSTRUCT RECEPTION-ONLY FRAME

PROCESS-7: CIRCULATE ONCE THE RECEPTION-ONLY FRAME

PROCESS-8: ELIMINATE RECEPTION-ONLY FRAME

LOOP TRANSMISSION SYSTEM WITH FRAME SYNCHRONIZATION CONTROL

BACKGROUND OF THE INVENTION

The present invention relates to a loop transmission system with frame synchronization control. The system according to the present invention is useful, for example, for frame synchronization control in which a frame synchronization cancellation signal is used for the control for taking-in or bypassing a node in a loop transmission line in a local area network (LAN) in association with computers distributed along the LAN.

DESCRIPTION OF THE RELATED ART

In general, in order to protect against errors in frame synchronization signals in a loop transmission system with frame synchronization control used, for example, for a LAN, the frame synchronization signals are monitored at regular intervals at which the frame synchronization signals are inherently expected to occur.

In this case, usually the synchronization state is maintained even if, for example, absence of the frame synchronization signal is detected once or so. Only after the absence of the frame synchronization signal has been detected a predetermined number of times is synchronization decided as lost and a new synchronization operation performed. Similarly, synchronization is not confirmed upon detection of receipt of a single frame synchronization signal, for example. Only after detection of the receipt of a predetermined number of the frame synchronization signals with predetermined timings is the frame synchronization decided as restored and the normal operation of reception and transmission of information enabled.

Assume that a supervisory device and a plurality of nodes are connected by a transmission loop to constitute a loop transmission system. The information transmitted through the transmission loop consists of a sequence of frames, each of the frames consisting of a frame header having frame synchronization signal (EP) and data.

Sometimes, a node in the transmission loop is bypassed because of a shutdown of the power source of the node in question. In this case, dummy data is produced in the supervisory device and the dummy data transmitted through the transmission loop.

When the node in question detects the dummy frame synchronization signal FP(D) in the frame header of the dummy data, the input portion and the output portion of the node in question are short-circuited so that the node in question in the loop transmission system is bypassed. In this case, the bypassing instruction is included in the frame header in addition to the synchronization signal Since the bypassing process is carried out at a timing within the duration of the dummy data, the length of transmission is reduced by the short-circuiting of the input portion and the output portion of the node in question. Hence, in appearance, a certain length of region is eliminated from the dummy data.

Due to this, there is a problem that, at the nodes downstream of the node in question, after the detection of a frame synchronization signal (FP), the next frame synchronization signal cannot be detected because of a timing error due to the reduction of length of the dummy data, so that the transmission and the reception of information in a number of frames from the frame subsequent to the frame synchronization signal in question are prevented until the restoration of synchronization by a synchronization operation. Furthermore, there is a problem that the nodes upstream of the node in question continue to transmit information regardless of the failure of synchronization until the failure of synchronization is acknowledged, while the nodes downstream of the node in question cannot receive such information transmitted from such upstream nodes.

Similarly, failure of synchronization can occur when a node is taken into the transmission loop.

When the taking-in of a node which has been bypassed to the transmission loop is informed from this node to the supervisory device, for example, by telephone, the supervisory device delivers dummy data. When the dummy frame synchronization signal FP(D) is detected by the node awaiting the taking-in, the short-circuit between the input portion and the output portion is released and the path from the input portion through the control portion to the output portion is inserted into the transmission loop. Hence, in appearance, a length of data corresponding to the inserted length of the transmission line is inserted into the length of the dummy data. Accordingly, there is a problem that the passage of the next frame synchronization signal (FP) at the node downstream of the node in question takes place after the elapse of a period longer than the frame period $(T_0)$ after the detection of the dummy frame synchronization signal FP(D), so that a failure of synchronization takes place and a number of the subsequent frames cannot be transmitted and received.

There is a problem that, when a delay phenomena occurs because of the start of a new operation of a device in a portion of the transmission loop or the bypassing of a device in a portion of the transmission loop, the failure of synchronization does not take place in the nodes upstream of the device in question but takes place in the node downstream the device in question. In such a case, the manner of control often becomes complicated because it is necessary to confirm from which timing the normal information transmission can be restarted.

SUMMARY OF THE INVENTION

It is an object of the present invention to provide an improved loop transmission system with frame synchronization control in which, taking-in of a node, bypassing of a node, taking-in of a sub-loop, or bypassing of a sub-loop, the duration of the interruption of transmission through the transmission loop is reduced and the loss of information from the information being transmitted is minimized accordingly.

According to the fundamental aspect of the present invention, there is provided a loop transmission system with frame synchronization control including: a loop through which information in the form of a sequence of frames is transmitted, a plurality of node units inserted at predetermined positions in the loop for receiving and delivering information, and a supervisory device inserted at a predetermined position in the loop for supervising the transmission of information through the loop in association with the node units. The supervisory device is operable to deliver a frame synchronization cancellation signal. Each of the node units is adapted to detect the frame synchronization cancellation signal and cancel the synchronized operation state in bypassing or taking-in of a node and to restore synchronization in the frame next to the synchronization cancelled frame. Therefore, quick restoration of synchronization after bypassing or taking-in of a node is ensured.

In embodying the present invention it is possible to adopt any of the following conditions:

1. One of the node units executes bypassing or taking-in of node when the frame synchronization cancellation signal is detected.
2. The supervisory device includes a unit for delivering a synchronization cancellation signal.
3. At least one of the node units is installed in a sub-loop coupled with a main loop of the loop through a junction box circuit.
4. Bypassing of a node is carried out in the duration of a dummy frame signal.
5. The junction box circuit includes a unit for delivering a synchronization cancellation signal.
6. The supervisory device is operable to generate a dummy frame.
7. Each of the node units has a dummy frame detection portion.
8. The dummy frame is eliminated after one circulation of the dummy frame through the loop is completed.
9. The constitution of a frame signal is arranged such that a predetermined reception-only frame adapted to just receive information is provided after bypassing of a sub-loop occurs, and the reception-only frame is eliminated after one circulation of the reception-only frame through the loop is completed, so that the frame length of the frame signal is adjusted.

BRIEF DESCRIPTION OF THE DRAWINGS

In the drawings, FIGS. 1A and 1B are a schematic diagram of a loop transmission system with frame synchronization control according to an embodiment of the present invention;

FIG. 2 shows a frame pattern of the information used in the loop transmission system;

FIG. 5 shows the waveforms of the signals appearing in the frame synchronization circuit;

FIGS. 7, 8A, and 8B are flow charts of the operation of the loop transmission system of FIGS. 1A and 1B;

FIGS. 9A and 9B are a schematic diagram of a loop transmission system with frame synchronization control according to another embodiment of the present invention.

DESCRIPTION OF THE PREFERRED EMBODIMENTS

Figure 1B:
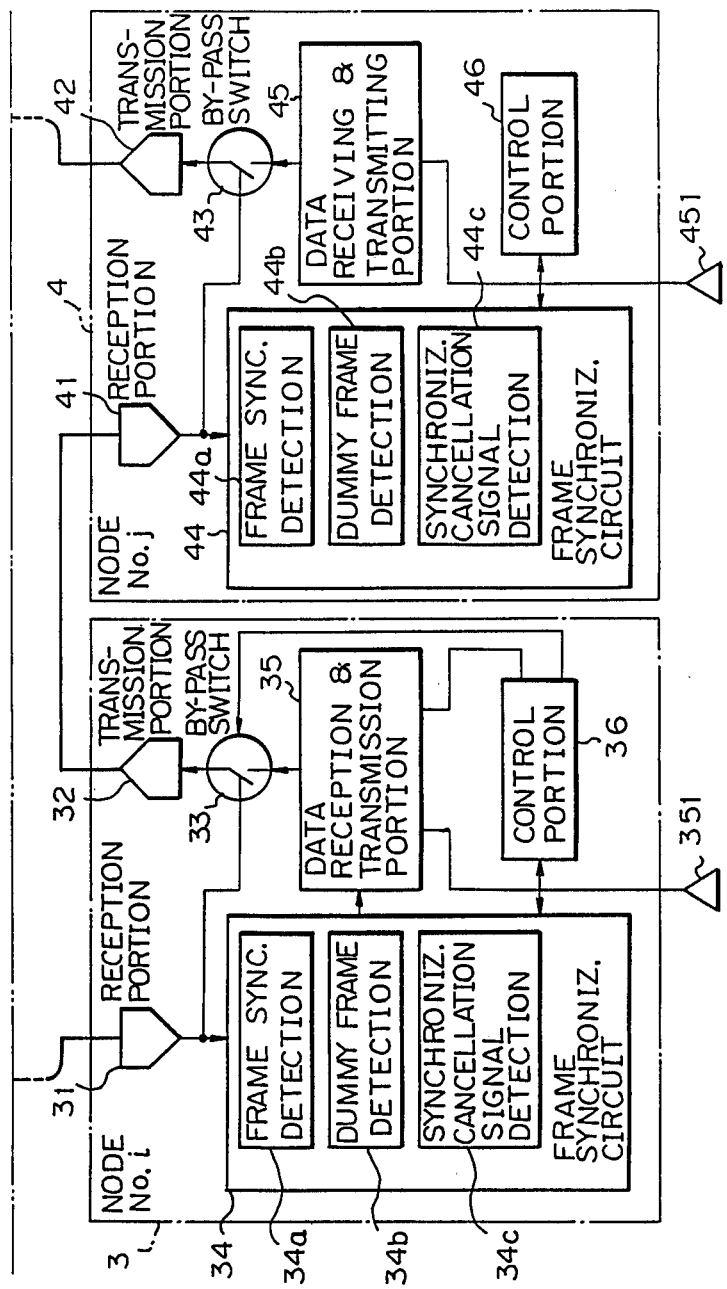
Figure 3:
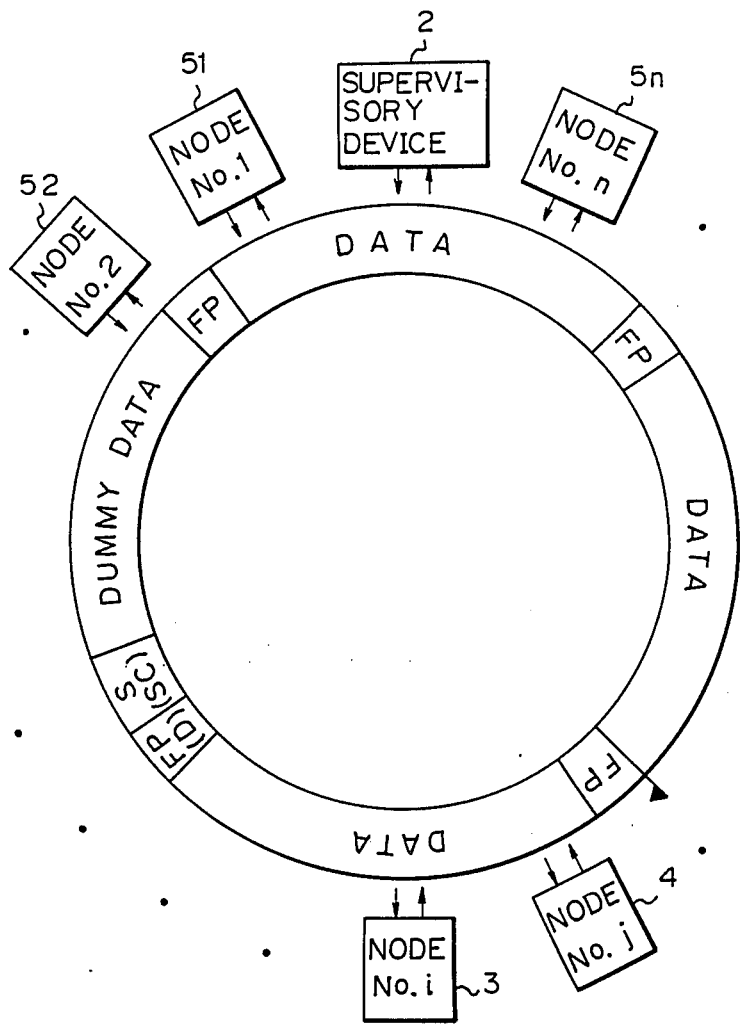
FIG. 3 shows a manner of transmission of the information along the transmission loop of the loop transmission system.

A loop transmission system with frame synchronization control according to an embodiment of the present invention is shown in FIGS. 1A and 1B. The frame pattern of information in the system of FIGS. 1A and 1B is shown in FIG. 2 and FIG. 3. The system of FIGS. 1A and 1B includes a loop transmission line 1, a supervisory device 2, and a plurality of nodes No. 1, No. 2, . . . , No. n which receive and transmit information. Among the nodes, node no. i is illustrated as node 3, and node no. j is illustrated as node 4.

The supervisory device 2 includes a synchronization cancellation signal generation portion 23, a frame buffer memory (FBM) 24, a reception portion 21, a transmission portion 22, a frame synchronization signal generation portion 25, a selector 26, a received frame detection portion 27, and a control portion 28.

The received frame detection portion 27 detects a frame synchronization signal FP or a dummy frame synchronization signal FP(D).

A dummy frame is delivered from the synchronization cancellation signal generation portion 23 when a node is to be bypassed. A dummy frame includes a dummy frame synchronization signal FP(D), a synchronization cancellation signal S(SC), and dummy data (FIG. 2). The dummy data is of a pattern which cannot easily be erroneously acknowledged as a frame synchronization signal.

The frame buffer memory (FBM) 24 is so operated that the transmission time of the transmission loop is made a whole multiple of the frame period $T_0$. The synchronization cancellation signal generation portion 23 generates a frame synchronization cancellation signal and a dummy frame.

Frame synchronization for information received after one circulation along the transmission loop 1 is maintained on the basis of the detection by the received frame detector 27. Information necessary for supervisory control is exchanged between the received frame detection portion 27 and the control portion 28. General data is written into the FBM 24. The frame synchronization signals are delivered periodically through the selector 26 from the frame synchronization signal generation portion 25. The data read from the FBM 24 is delivered through the selector 26 in coincidence with the period of the above-mentioned frame synchronization signal.

Node 3, which is a representative of nodes No. 1, No. 2, . . . , No. n, includes a reception portion 31, a transmission portion 32, a bypassing switch 33, a frame synchronization circuit 34, a data reception and transmission portion 35, and a control portion 36. A terminal device 351 is connected with the data reception and transmission portion 35. The frame synchronization circuit 34 includes a frame synchronization signal detection element 34a, a dummy frame detection element 34b, and a synchronization cancellation signal detection element 34c. The structure of the frame synchronization circuit 34 will be later explained with reference to FIGS. 4A and 4B.

When the movable contact of the bypassing switch 33 contacts the left-side fixed contact connected with the reception portion 31, the signal received by the reception portion 31 bypasses the node 3 through the bypassing route 31-33-32. In this case, the frame synchronization at node 3 is maintained by the operation of the frame synchronization circuit 34, and the node 3 awaits receipt of a synchronization cancellation signal. Thus, the node 3 is in a waiting state awaiting the taking-in to the transmission loop 1.

A manner of transmission of the information along the transmission loop 1 of the transmission system of FIGS. 1A and 1B is illustrated in FIG. 3. In FIG. 3, the pattern of information is illustrated in a circle to represent the circulation of the information along a transmission loop, which can be expressed as a circle. The beginning of the information is marked by a triangular flag symbol. Outside the circle, the supervisory device 2 and a sequence of nodes No. 1, No. 2, . . . , No. i, No. j, . . . , No. n are arranged to represent the distribution of the supervisory device and nodes. The reception/transmission of information at the supervisory device or node is carried out at the phase of the circular information pattern just in front of the supervisory device or node in question. The illustration of FIG. 3 will provide the basis of the later illustration of FIGS. 6A to 6G.

Figure 4A:
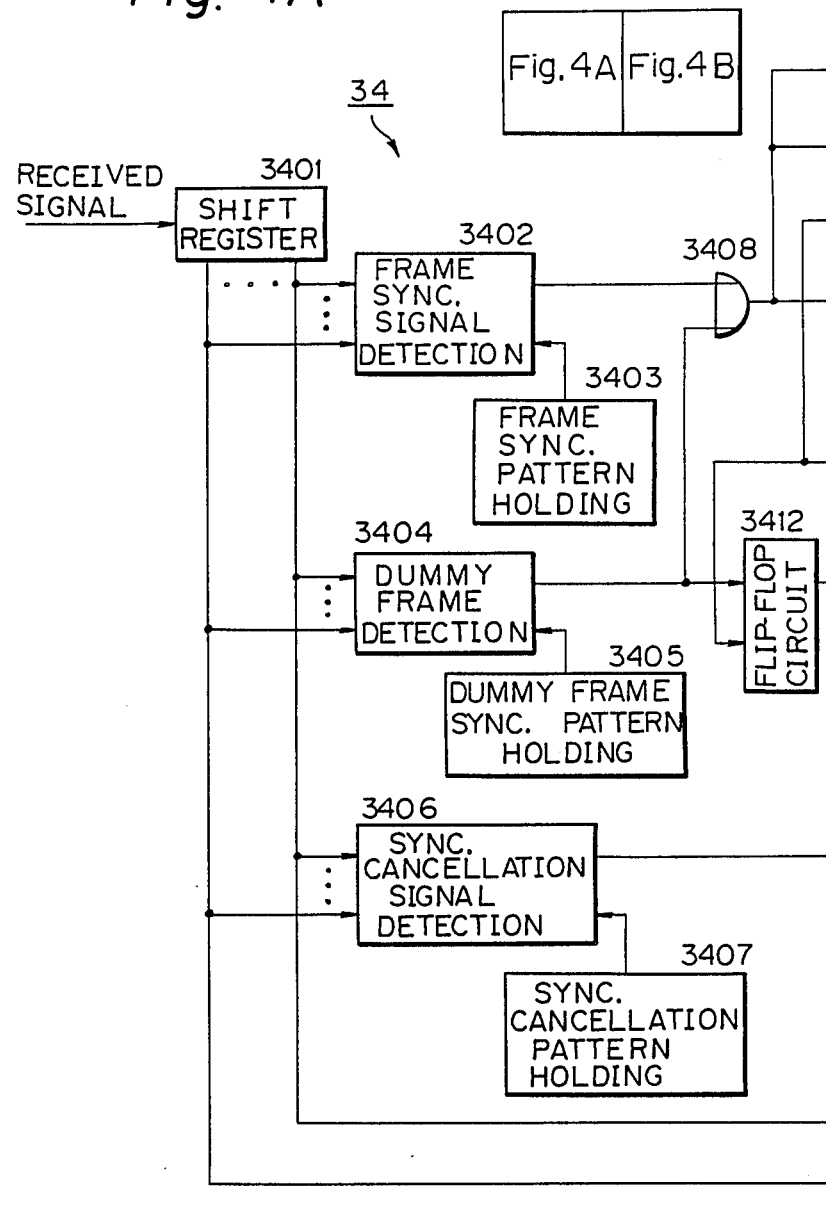
FIGS. 4A and 4B show the structure of the frame synchronization circuit in a node in the loop transmission system of FIGS. 1A and 1B.
Figure 4B:
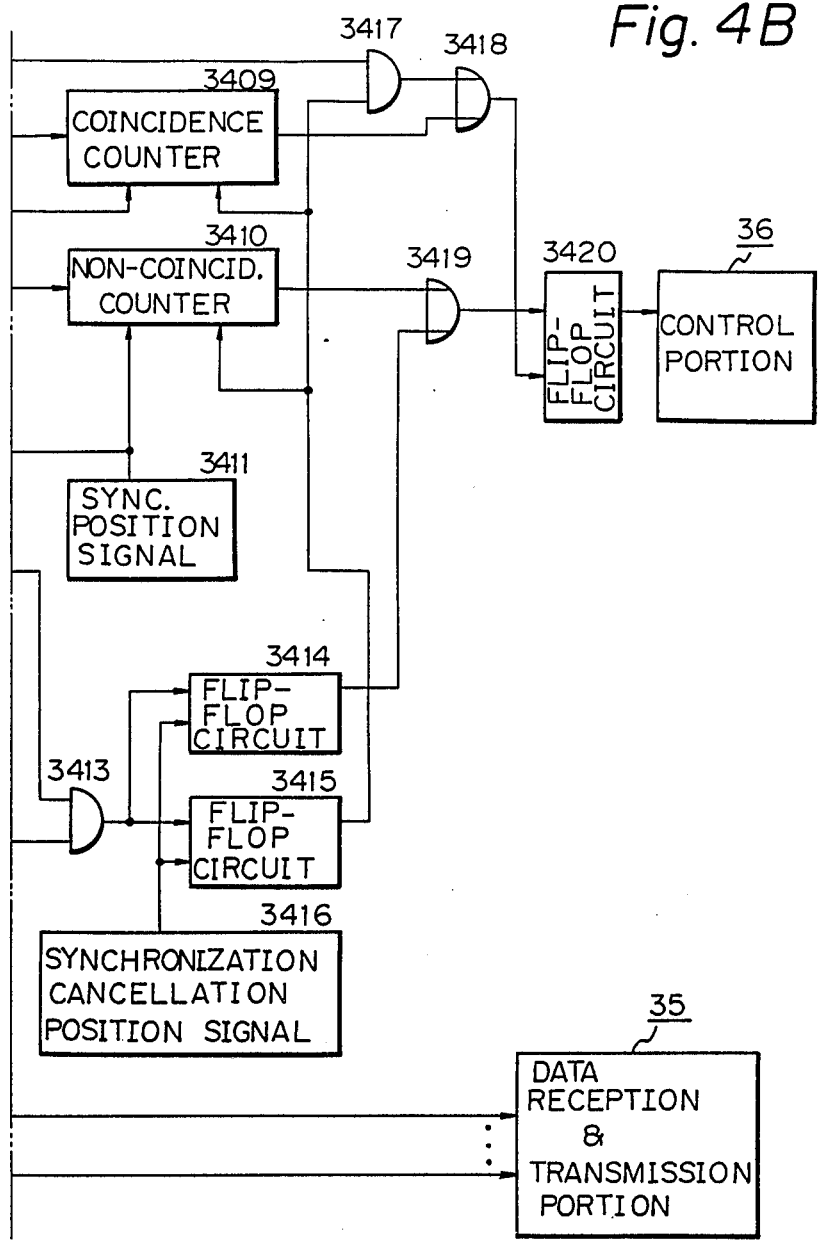

The structure of the frame synchronization circuit 34 in the node 3 in the loop transmission system of FIGS. 1A and 1B is shown in FIGS. 4A and 4B. The frame synchronization circuit 34 includes a shift register 3401, a frame synchronization signal detection portion 3402, a frame synchronization pattern holding portion 3403, a dummy frame detection portion 3404, a dummy frame synchronization pattern holding portion 3405, a synchronization cancellation signal detection portion 3406, and a synchronization cancellation pattern holding portion 3407.

The frame synchronization circuit 34 also includes an OR gate 3408, a coincidence counter 3409, a non-coincidence counter 3410, a synchronization position signal generation portion 3411, a flip-flop circuit 3412, an AND gate 3413, flip-flop circuits 3414 and 3415, a synchronization cancellation position signal generation portion 3416, an AND gate 3417, OR gates 3418 and 3419, and a flip-flop circuit 3420.

The operation of the frame synchronization circuit 34 will now be described with reference to FIG. 5, which shows the waveforms of the signals appearing in the portions of the frame synchronization circuit.

First, the normal operation is described.

In this case, the dummy frame does not exist. The frame signals consisting of the frame synchronization signal FP and the data $d_1$, $d_2$, . . . are supplied successively to the shift register 3401. In the frame synchronization signal detection portion 3402, the signal from the shift register 3401 and the signal from the frame synchronization pattern holding portion 3403 are compared and the frame coincidence signal S (3402) is delivered as the detection of a frame synchronization signal FP. This frame coincidence signal S (3402) is transmitted through the OR gate 3408 to the coincidence counter 3409 and the non-coincidence counter 3410.

The counting of the synchronization signal S (3411) in the coincidence counter 3409 is carried out under the condition of existence of the coincidence signal S (3408), so that the number of applications of the coincidence signal S (3408) is counted in the coincidence counter 3409. The synchronization signal S (3411) in the non-coincidence counter 3410 is counted under the condition of absence of the coincidence signal S (3408), so that the number of non-coincidences, i.e., the number of asynchronizations, is counted in the non-coincidence counter 3410.

The coincidence signal S (3408) is also supplied to the AND gate 3417. The dummy frame coincidence signal S (3404) indicating the detection of the dummy frame synchronization signal FP(D) is not delivered from the dummy frame detection portion 3404. Hence the potential of the output signal S (3412) of the flip-flop circuit 3412 is LOW. Accordingly, the potential of the output S (3413) of the output S (3413) of the AND gate 3413 is LOW. The potential of the output of the flip-flop circuit 3415 is LOW. Accordingly, the potential of the output S (3417) of the AND gate 3417 is LOW.

The signal of HIGH potential is delivered from the coincidence counter 3409 after the counting of a predetermined number of the coincidence signals S (3408) in the coincidence counter 3409. This signal is supplied to the OR gate 3418. Hence, the reset signal S (3418) is transmitted from the OR gate 3418 to the flip-flop circuit 3420, so that no output is delivered from the flip-flop circuit 3420.

When failure of synchronization occurs, the frame coincidence signal S (3402) is not delivered from the frame synchronization signal detection portion 3402, so that the coincidence signal S (3408) is not delivered from the OR gate 3408. Hence, the signal of HIGH potential is delivered from the non-coincidence counter 3410 after the counting of a predetermined number of the synchronization position signals S (3411) in the non-coincidence counter 3410. Hence, the OR gate 3419 delivers the output signal which is supplied as the reset signal to the flip-flop circuit 3420. Accordingly, the potential of the frame synchronization signal S (3420) which is delivered from the flip-flop circuit 3420 becomes HIGH.

When a dummy frame synchronization signal FP(D) is registered in the shift register 3401 on the basis of the supply of the dummy frame from the supervisory device 2, the signal from the shift register 3401 and the signal from the dummy frame synchronization pattern holding portion 3405 are compared in the dummy frame detection portion 3404, and the frame coincidence signal S (3404) indicating the detection of the dummy frame synchronization signal FP(D) is delivered from the dummy frame detection portion 3404. On the basis of this frame coincidence signal S (3404), the potential of the output S (3412) of the flip-flop circuit 3412 becomes HIGH.

When a synchronization cancellation signal is registered in the shift register 3401, the signal from the shift register 3401 and the signal from the synchronization cancellation pattern holding pattern 3407 are compared in the synchronization cancellation signal detection portion 3406, and the potential of the coincidence signal S (3406) indicating the detection of the synchronization cancellation signal becomes HIGH.

Because of the HIGH potential of both the signal S (3406) and S (3412), the AND gate 3413 delivers the output of HIGH potential, so that the flip-flop circuits 3414 and 3415 are set. The output of the OR gate 3419 is supplied to the flip-flop circuit 3420 to set the flip-flop circuit 3420, on the basis of the output of the flip-flop circuit 3414. Hence, the potential of the frame asynchronization signal S (3420) becomes HIGH.

When a frame synchronization signal FP is transmitted next to the transmission of the dummy data, a frame coincidence signal S (3402) is delivered from the frame synchronization signal detection portion 3402, so that the potential of the coincidence signal S (3408) from the OR gate 3408 becomes HIGH. The potential of the output S (3415) of the flip-flop circuit 3415 is HIGH. The potential of the output S (3417) of the AND gate 3417 becomes HIGH when the potential of the coincidence signal S (3408) becomes HIGH, so that the signal S (3417) is supplied as the reset signal to the OR gate. The signal S (3418) from the OR gate 3418 resets the flip-flop circuit 3420, so that the potential of the frame asynchronization signal S (3420) becomes LOW to realize the normal operation. The potential of the signal S (3412) from the flip-flop circuit 3412 is kept HIGH until the next synchronization position signal S (3411) is transmitted. However, no erroneous operation takes place, since the normal position under a new synchronization state is indicated by the synchronization cancellation position signal S (3416).

Second, the operation of the taking-in of a node is described.

General data is received by the reception portion 21 of the supervisory device 2. The received general data is written into the FBM 24. The data read from the FBM 24 is delivered through the transmission portion 22.

The taking-in of the node 3 is instructed by an operator at the node 3 by, for example, switching on a power source in the node 3.

Figure 6A:
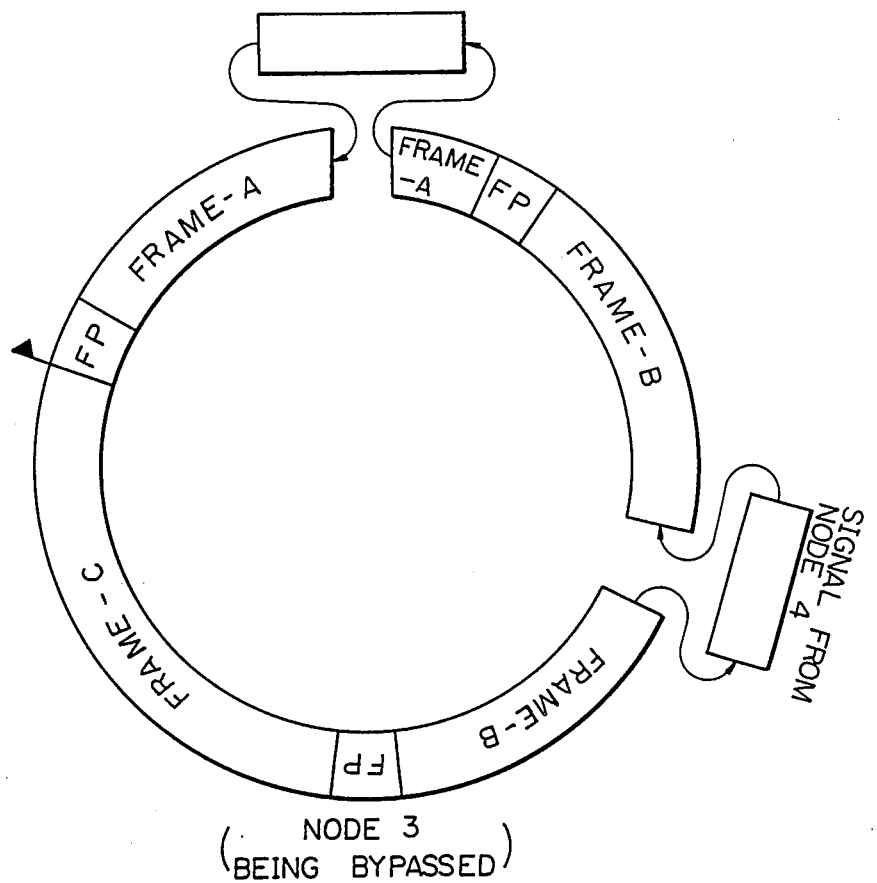
FIGS. 6A to 6G illustrate the operation of the loop transmission system of FIGS. 1A and 1B.
Figure 6B:
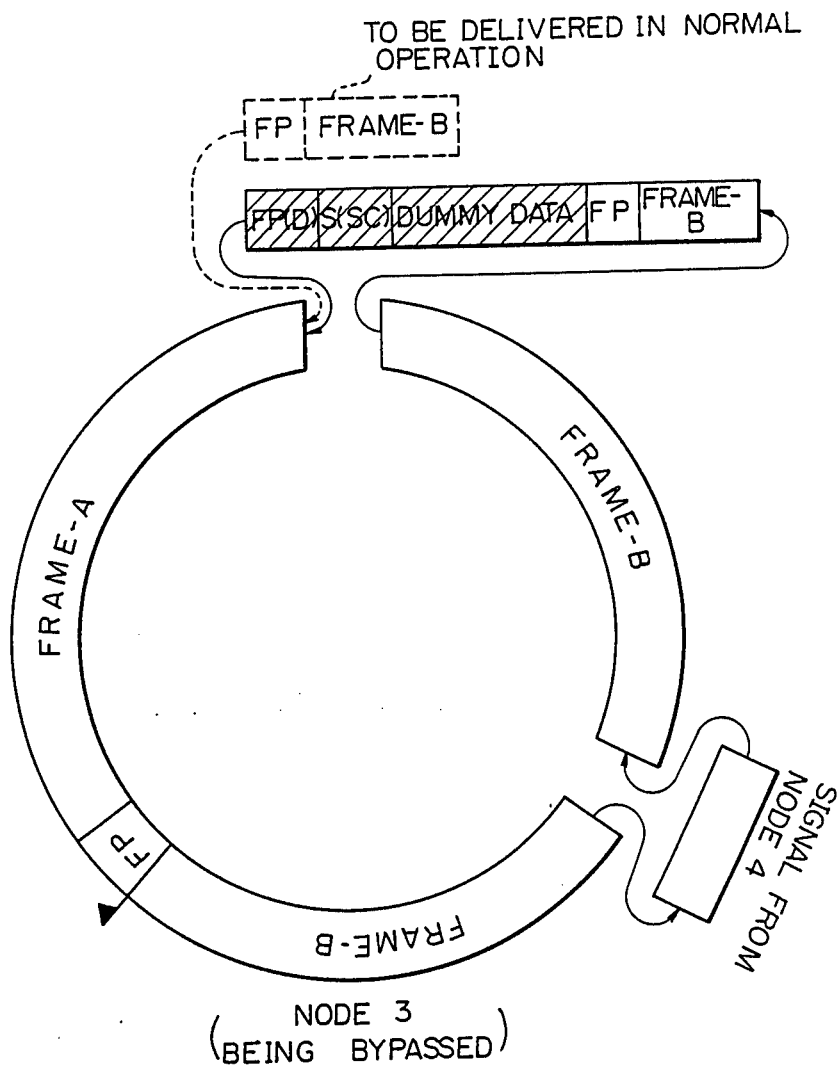

The control portion 28 carries out data transmission stoppage control for the FBM 24 to cause the synchronization cancellation signal generation portion 23 to deliver a frame synchronization cancellation signal, when the frame synchronization signal FP at the beginning of the frame in question is positioned at the transmission end of the FBM 24. Hence, the synchronization cancellation signal generation portion 23 delivers a dummy frame synchronization signal FP(D), a synchronization cancellation signal S(SC), and dummy data (FIG. 6B). It is not necessary to make the length of the dummy frame consisting of the above-mentioned FP(D), S(SC), and the dummy data the same as the length of the frame signal. The length of the dummy frame may be shorter than the length of the frame signal.

Figure 6C:
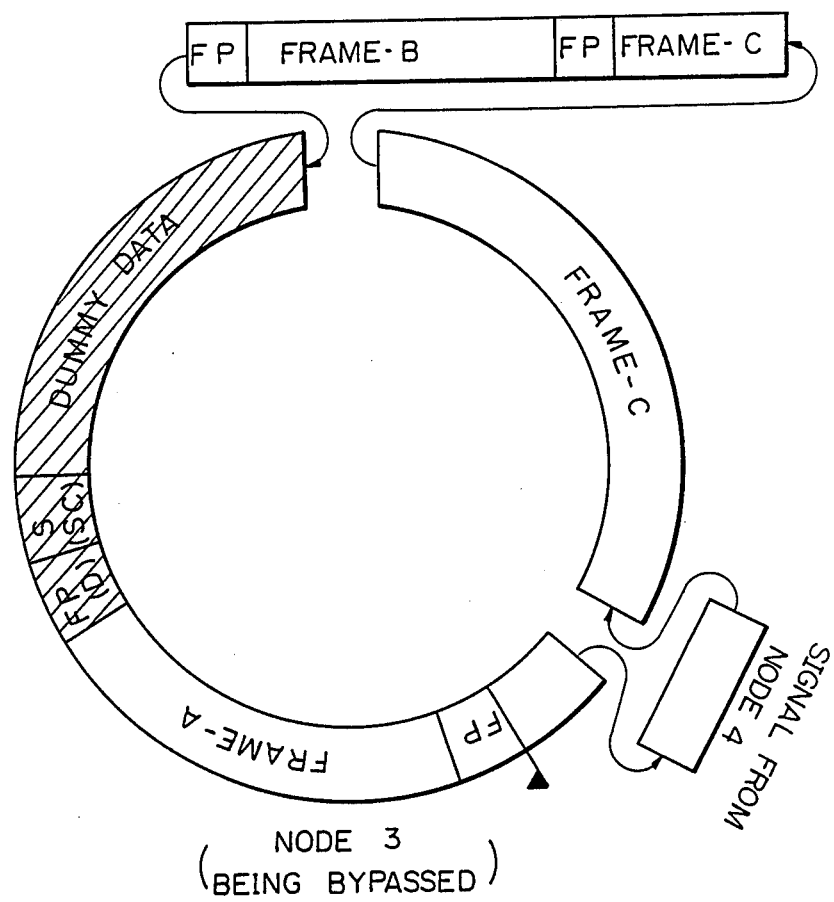

While the dummy frame is being delivered, the frame B and the frame C are stored in the FBM 24 successively. The control portion 28 delivers the frame B and frame C read from the FBM 24 successively after the dummy frame. Thus, the dummy frame is inserted in the transmission loop (FIG. 6C).

When the node No. 1 (51) receives the synchronization cancellation signal, reception and transmission of data during the dummy frame are stopped and the synchronization is cancelled to await receipt of the next synchronization signal FP. The reception and the transmission of the data at the node No. 1 (51) are restarted in synchronization with the above-mentioned next synchronization signal FP.

Similar operations are carried out at the node No. 2, No. 3, and so on.

When the frame synchronization circuit 34 in the node 3 detects the synchronization cancellation signal of the dummy frame, an asynchronization signal S (3420) is delivered (FIG. 5). The delivery of this synchronization signal is informed to the control portion 36, so that the node bypassing switch 33 is switched from the bypassing side to the side of the data reception and transmission portion 35. When the switching is carried out after the synchronization cancellation signal is detected, the synchronization cancellation signal has been supplied through the bypass switch 33 to the next node.

Due to the switching of the node bypass switch 33, the dummy frame is transmitted through the data reception and transmission portion 35. Hence, there occurs a delay until all of the dummy frame again reaches the node bypass switch 33. Accordingly, it is necessary to ensure the data during such delay.

Figure 6D:
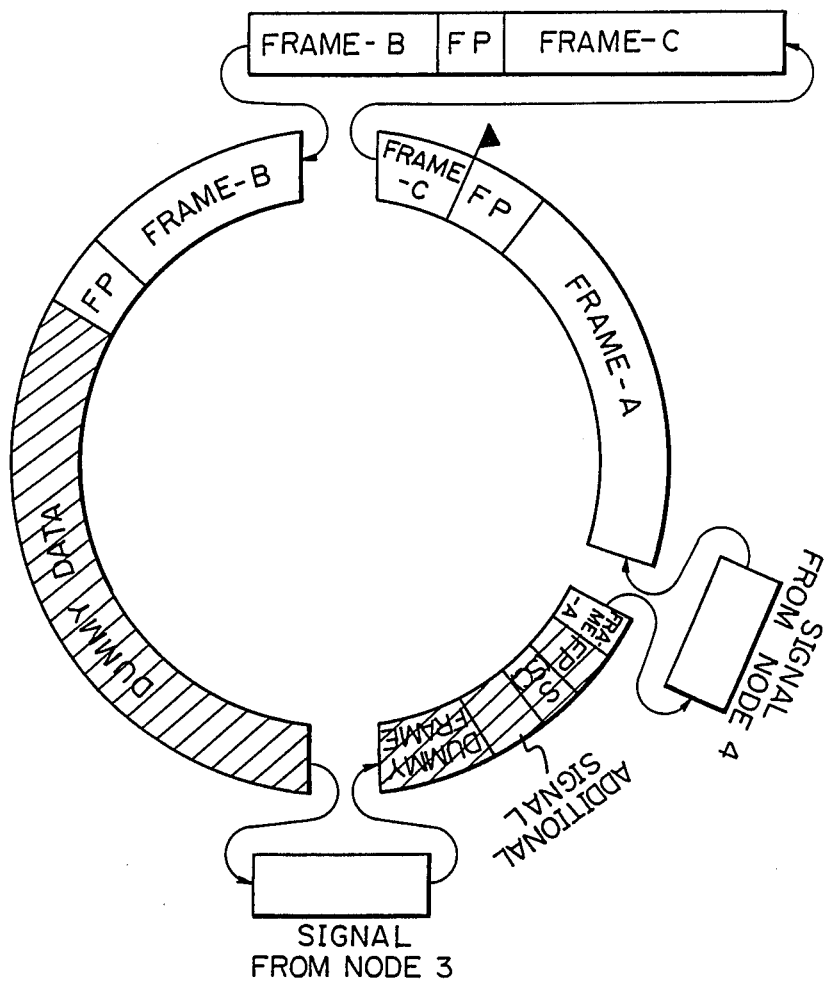

For this purpose, the frame synchronization circuit 34 delivers through the bypass passage the signal on the transmission loop by the time of detection of the synchronization cancellation signal. The signal during the dummy frame, i.e., the signal equivalent to the dummy data, is delivered from a dummy data delivery portion to supply the data reception and transmission portion with the delivered signal (FIG. 6D). Here, the "signal equivalent to the dummy data" is a signal which is the same as the dummy data or a signal by which erroneous operations in the downstream nodes do not occur.

Figure 6E:
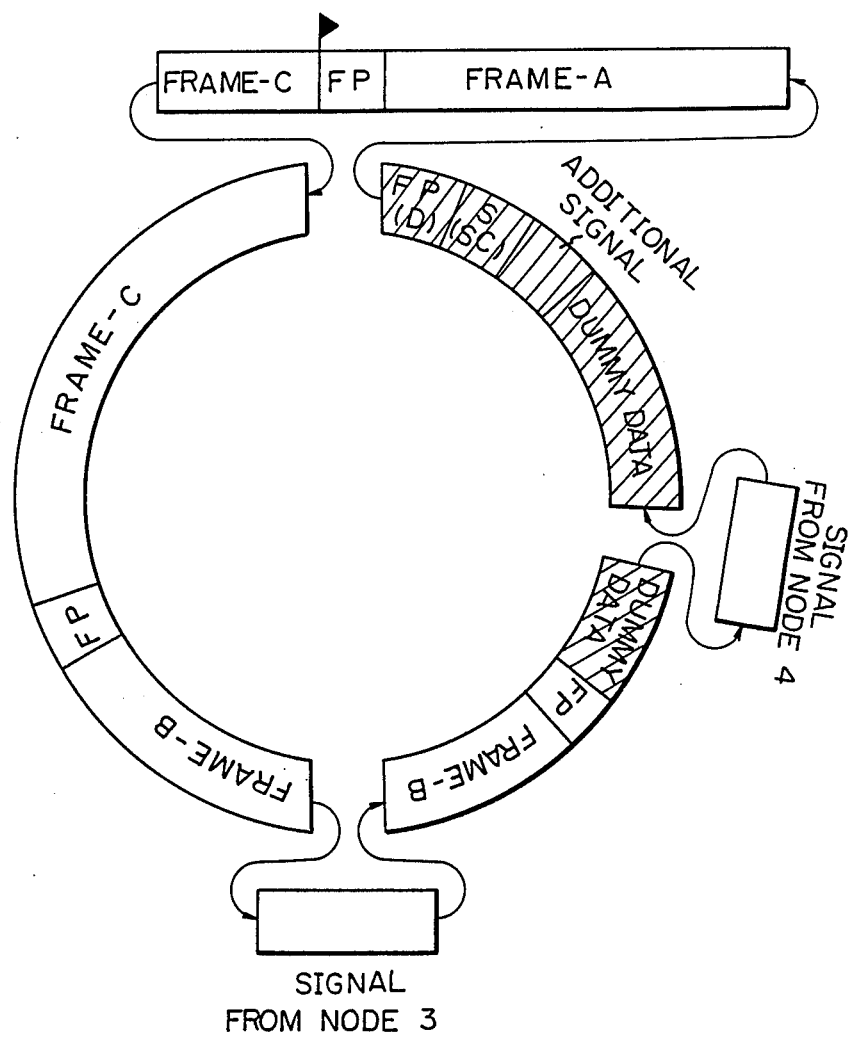

When the next frame synchronization signal is received by the frame synchronization circuit 34 of the node 3, the node 3 detects the receipt of the next frame synchronization signal and the synchronizing operation is carried out, so that the taking-in of the node 3 is achieved (FIG. 6E).

When the node 4 (Node No. j), which is downstream of the node 3, detects the synchronization cancellation signal in the dummy frame, the reception and transmission of data are stopped in the node 4 as in the case of the node No. 1, node No. 2, and so on, and the reception of the next frame synchronization signal FP is awaited in the node 4. The time length at the node 4 up to the next frame synchronization signal FP with regard to the dummy frame is different from that at the upstream node No. 1 or node No. 2 because of the insertion of dummy data for taking-in of the node 3. The node 4 awaits to receive the frame synchronization signal, regardless of such difference in the time length.

Following the above-described processes through the nodes, the frame having the synchronization cancellation signal and the dummy data returns to the supervisory device 2 (FIG. 6E).

Figure 6F:
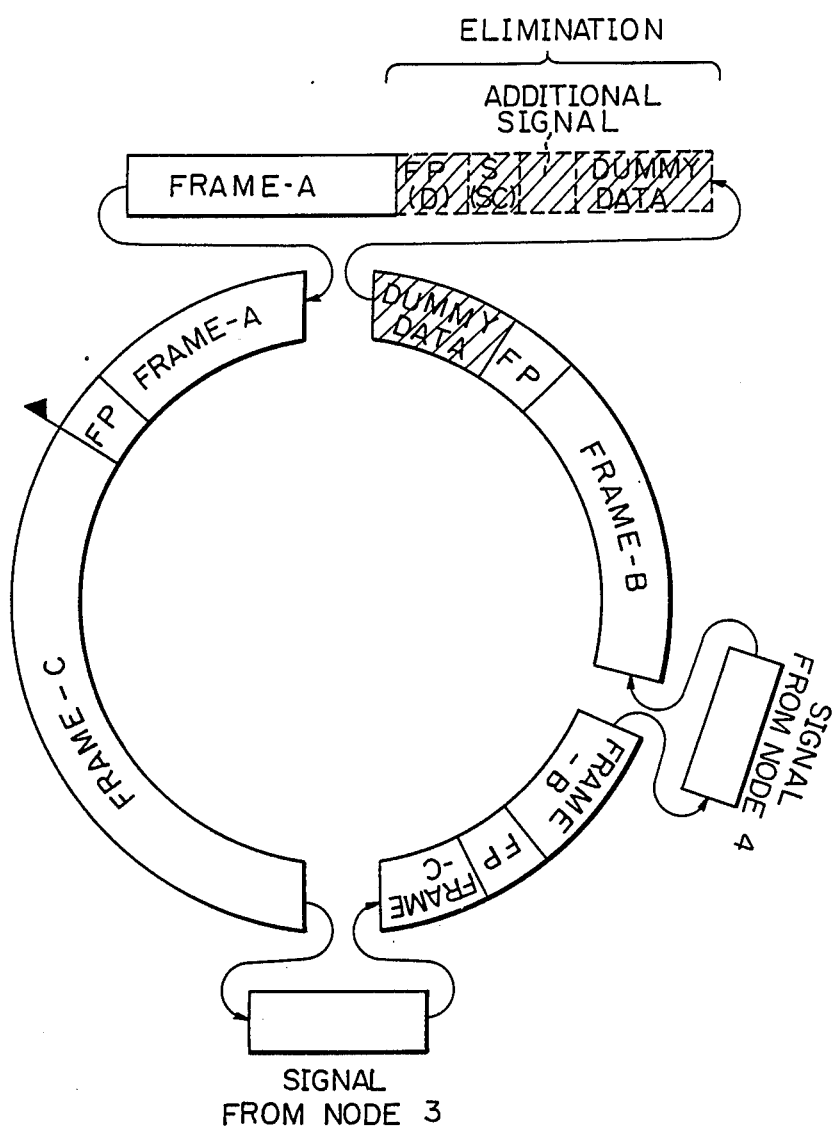

When the return of the dummy frame is acknowledged by the detection of the dummy frame synchronization signal and the synchronization cancellation signal by the received frame detection portion 27, the elimination of the dummy frame beginning with the dummy frame synchronization signal is carried out. The elimination of the dummy frame, without writing of data into the FBM 24, is continued until the next frame synchronization signal is detected (FIG. 6F).

Figure 6G:
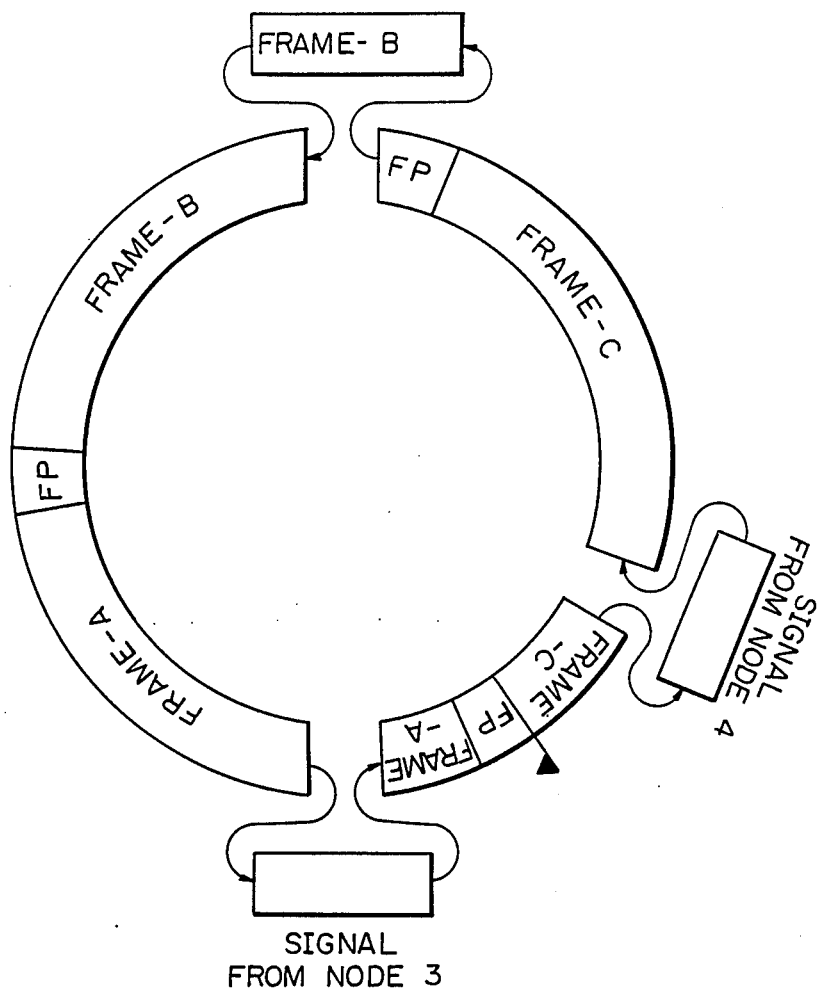

When the receipt of the next frame synchronization signal FP is detected by the received frame detection portion 27, the normal operation state is restored, and the writing of the received signal into the FBM 24 is restarted (FIG. 6G). After the elimination of the received dummy frame, the buffer amount of the FBM 24 returns to the usual buffer amount of the initial buffer amount plus/minus increase/decrease of delay due to, for example, the bypass cancellation, increase of delay, bypass setting, or decrease of delay.

Third, regarding the operation of bypassing of a node, a similar explanation applies as with the operation of taking-in of a node.

The operation of a node is described with reference to the flow chart of FIG. 7. In the processes expressed in the flow chart of FIG. 7, an instruction of taking-in or bypassing is given by an operator (S11). The decisions whether a dummy frame is detected, whether a synchronization cancellation signal is passed, and which of the taking-in or the bypassing is taking place are carried out (S12, S13, S14).

When the result of the last decision is "taking-in", stoppage of the bypassing or the node bypassing is carried out (S15). Then, the decision whether the synchronization signal is detected is carried out (S16). When this decision is YES, the process proceeds to the operation state.

When the result of the above-mentioned decision as to which of the taking-in or the bypassing is taking place is "bypassing", the node bypassing is carried out to proceed to the end of the process (S17).

Figure 8A:
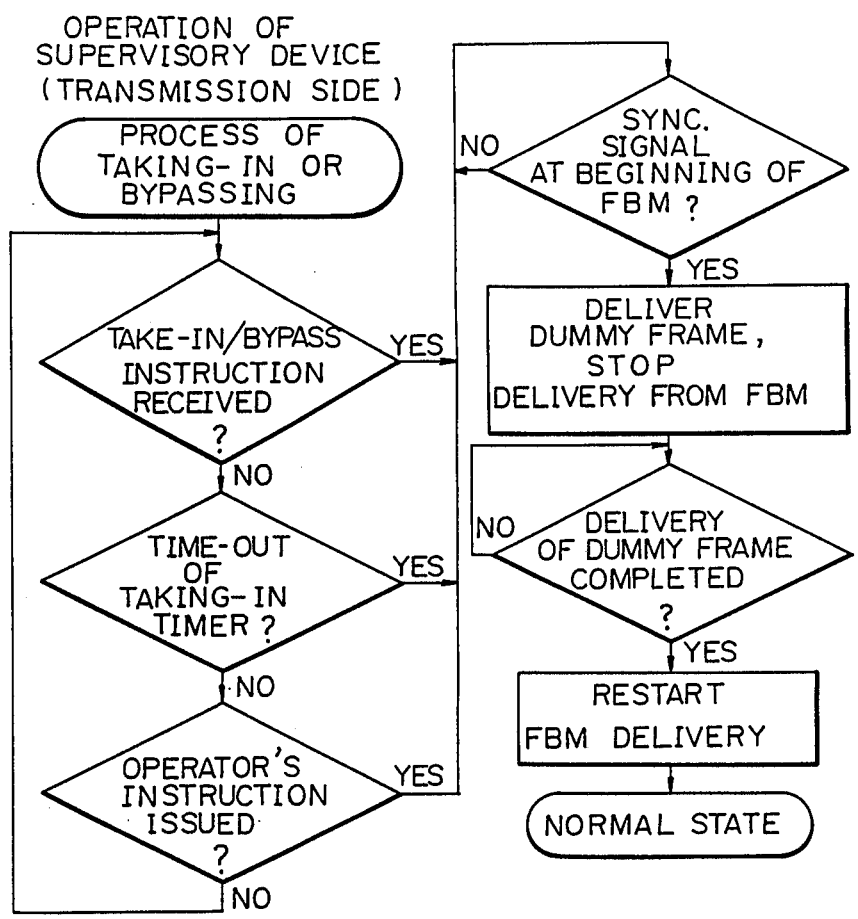

The operation of the supervisory device 2 regarding the transmitter side is illustrated in the flow chart of FIG. 8A. The operation of the supervisory device 2 regarding the receiver side is illustrated in the flow chart of FIG. 8B.

In the flow chart of FIG. 8A, the processes of taking-in or bypassing at the side of the transmitting portion are expressed. On the basis of an affirmative result of the decisions concerning whether the taking-in or bypassing instruction is received, whether the taking-in timer is in the state and whether the operator's instruction is issued (S21, S22, S23), the process proceeds to the decision whether a synchronization signal exists at the beginning of the FBM (S24). When the result of this decision is affirmative, a dummy frame is delivered and the delivery of data from the FBM is stopped (S25). Then, the decision whether the delivery of the dummy frame is completed is carried out (S26). When the result of this decision is affirmative, the delivery of data from the FBM is restarted (S27), and the process proceeds to the normal state.

Figure 8B:
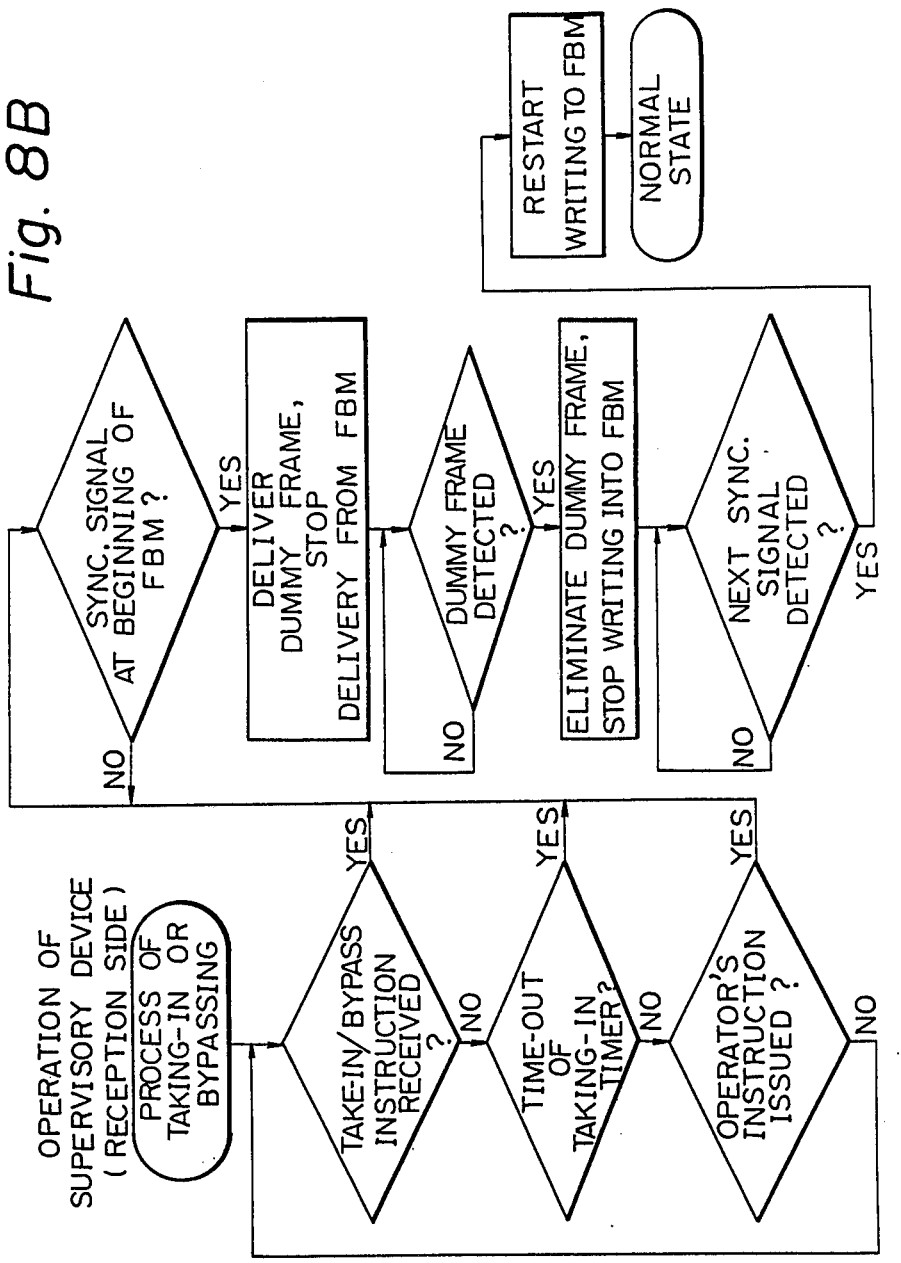

In the flow chart of FIG. 8B, the processes up to the process of the delivery of a dummy frame and the stoppage of the delivery of data from the FBM are the same as in the case of FIG. 8A (S31, S32, S33, S34, S35). After that, the decision whether or not the dummy frame is detected is carried out (S36). When the result of this decision is affirmative, the dummy frame is eliminated and the writing of data into the FBM is stopped (S37), and the decision whether the next synchronization signal is detected is carried out (S38). When the result of this decision is affirmative, the writing of data into the FBM is restarted (S39), and the process proceeds to the normal state.

In the system of FIGS. 1A and 1B, the buffer amount of the FBM can be selected as the necessary buffer amount, taking the maximum amount of data, with some allowance for fluctuation into consideration. Regarding the length of the dummy frame, the length can be selected as different from the length of the regular frame. Regarding the type of the loop, it is possible to use a double loop type transmission loop instead of the single loop type transmission loop described above. Regarding the delivery of the dummy frame, deliveries at a predetermined interval, for example, once per each frame or once per n frames, of the dummy frame with a synchronization cancellation signal can be adopted, instead of deliveries of dummy frames along with need, as in the above-described case. In this alternative case, the instructions of the setting and cancellation of the bypassing need not be controlled by the supervisory device.

Regarding the cause of variation of the delay, the variation can be caused by operations other than the bypassing and the bypass cancellation of a node in the case described above, for example, an additional provision of nodes.

Figure 9B:
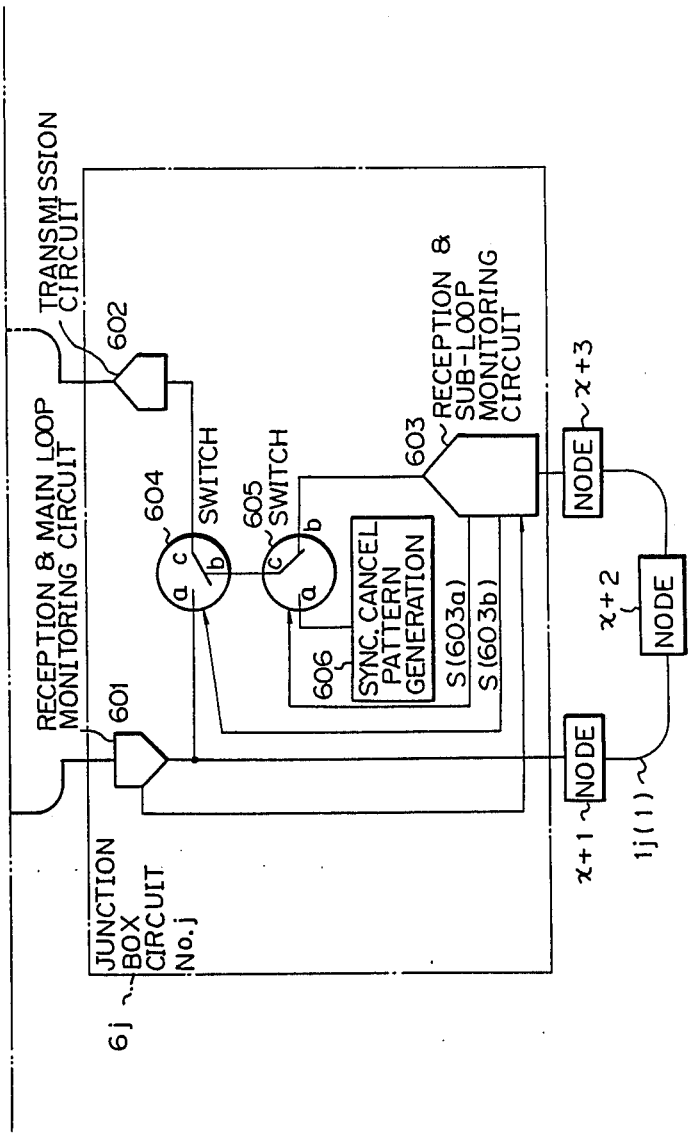

A loop transmission system with frame synchronization control according to another embodiment of the present invention is shown in FIGS. 9A and 9B.

In the loop transmission system of FIGS. 9A and 9B, the transmission loop consists of a main loop (ring) 100 and a plurality of sub-loops (sub-rings) 111, . . . , li(1), li(2), lj(1), . . . , ln(1). A supervisory device 2 is inserted in the main loop 1. A number of nodes are inserted in each of the sub-loops. Also, a node 7 is inserted in the main loop. The sub-loops are connected with the main loop throgh junction box circuit No. 1, (61); . . . ; No. i, (6i); No. j, (6j); . . . ; No. n, (6n). The receipt and transmission of information are carried out in each of the nodes inserted in the sub-loops.

The structure of the supervisory device 2 is fundamentally the same as the supervisory device in the system of FIGS. 1A and 1B.

The junction box circuit 6j includes a reception and main loop monitoring portion 601, a transmission portion 602, a reception and sub-loop monitoring portion 603, switches 604 and 605, and a synchronization cancellation pattern generation portion 606.

The synchronization cancellation pattern generation portion 606 delivers a synchronization cancellation pattern signal. The reception and sub-loop monitoring circuit 603 receives the signal transmitted from the sub-loop lj(1), detects whether or not the received signal contains abnormal data, and controls the switches 604 and 605 according to a predetermined logic described later. The switch 604 carries out the switching between the taking-in of the sub-loop lj(1) to the main loop 100 and the bypassing of the sub-loop lj(1). The switch 605 carries out the switching between the formation of the passage for the taking-in of the sub-loop lj(1) and the formation of the passage for the synchronization cancellation signal from the synchronization cancellation pattern generation portion 606 to the main loop 100.

Each of the nodes in the system of FIGS. 9A and 9B includes a frame synchronization circuit. The structure of the frame synchronization circuit is fundamentally the same as the frame synchronization circuit shown in FIGS. 4A and 4B for the system of FIGS. 1A and 1B, except that the dummy frame synchronization detection portion 3404, the dummy frame synchronization pattern holding portion 3405, the flip-flop circuit 3412, the AND gate 3413, and the OR gate 3408 do not exist.

When a failure occurs in the node x in the sub-loop li(2) for the junction box circuit 6i, the junction box circuit 6i detects this failure. When this failure is detected, the bypassing of the sub-loop li(2) is carried out and a synchronization cancellation signal is delivered from the synchronization cancellation pattern generation portion to the main loop 100. This synchronization cancellation signal is of a unique pattern which does not usually exist on the transmission loop consisting of the main loop and the sub-loops. When the delivered synchronization cancellation signal is detected by the node x+1, which is downstream of the node x, the frame synchronization is cancelled, the reception/transmission of data is stopped, and the detection control of the next frame synchronization signal is carried out. Then, the synchronized state is restored by detecting the frame synchronization signal next to the synchronization cancellation signal so that the reception/transmission of data takes place.

The operation of the junction box circuit in the system of FIGS. 9A and 9B is described below.

In the junction box circuit 6j, as an example of the junction box circuits 61, 62, . . . , 6n, a failure on the sub-loop lj(1) is detected by monitoring by the reception and main loop monitoring portion 606 and the reception and sub-loop monitoring circuit 603. According to the result of this detection and on the basis of the control signal from the reception and sub-loop monitoring circuit 603, the switches 604 and 605 are switched.

In the reception and main loop monitoring circuit 601 and the reception and sub-loop monitoring circuit 603, a data error detection portion using the parity check method and the frame check sequence method and a physical checking portion such as a clock period detection device for checking the absence of the signal are provided in addition to the frame synchronization circuit. Both the reception and main loop monitoring portion 601 and the reception and sub-loop monitoring circuit 603 carry out detection as to whether the transmitted data is in a normal state or abnormal state by detection of the continuous absence of the frame synchronization signal, by detection of the synchronization cancellation signal, or the like.

By carrying out the decision as to whether both the transmitted data regarding the reception and main loop monitoring portion 601 and the reception and sub-loop monitoring circuit 603 are normal, whether both the transmitted data regarding the reception and main loop monitoring portion 601 and the reception and sub-loop monitoring circuit 603 are abnormal, or whether the transmission data regarding the reception and main loop monitoring portion 601 is normal and the transmission data regarding the reception and sub-loop monitoring circuit 603 is abnormal, the operations described below are carried out.

First, the case of bypassing of a sub-loop is described.

With the reception and main loop monitoring circuit 601 is in a normal state, detection by the reception and sub-loop monitoring circuit 603 of an abnormal state means that a failure has occured in the sub-loop lj(1) connected with the junction box circuit 6j.

Hence, the circuit 603 acknowleges the occurrence of failure in the sub-loop lk(1) according to the checking by the circuit 601 and the checking by the circuit 603 and controls the switch 605 to turn the movable contact c from the fixed contact b to the fixed contact a by the signal S (603a). Accordingly, the synchronization cancellation signal is delivered through the switches 605 and 604 from the synchronization cancellation pattern generation portion 606. After that, the switch 604 is controlled, by the signal S (603b) from the circuit 603, to turn the movable contact c from the fixed contact b to the fixed contact a. Thus, the frame signal transmitted with the frame period $T_0$ is transformed to an abnormal data into which a synchronization cancellation signal is inserted instead of the data on the sub-loop.

In this case, in the junction box circuits downstream, reception and main loop monitoring circuits and reception and sub-loop monitoring circuits detect the abnormal state, since the signal containing the abovementioned abnormal data is transmitted through reception and main loop monitoring circuits and reception and sub-loop monitoring circuits. However, the reception and sub-loop monitoring circuits decide that no abnormality exists in their own sub-loops, so that the above-described operation in the junction box circuit 6j does not take place in the junction box circuits downstream.

Second, the case of the taking-in of a sub-loop is described.

When the above-mentioned failure in a sub-loop is eliminated, both the reception and main loop monitoring circuit 601 and the reception and sub-loop monitoring circuit 603 are restored to the normal state. By the control signal from the circuit 603, the switch 604 is controlled to turn the movable contact c from the fixed contact a to the fixed contact b. The synchronization cancellation signal is delivered through the switches 605 and 604 from the portion 606. After that, the switch 605 is controlled to turn the movable contact c from the fixed contact a to the fixed contact b. Accordingly, the signal, in which a portion of the signal present on the sub-loop is replaced by the synchronization cancellation signal, is inserted into the frame signal.

The overall operation of the system of FIGS. 1A and 1B can be described as follows.

(1) The system is operating normally. All of the sub-loops are taken in the main loop. The frame signals are transmitted through the main loop and sub-loops with frame period $T_0$. The frame signals are supplied to the FBM 24 in the supervisory device 2. The information transmitted through the main loop and sub-loops is controlled to ba a whole multiple of the frame period $T_0$ by the function of the FBM 24.

(2) An abnormality occurs in a node in the sub-loop lj(1) connected to the junction box circuit 6j. The reception and sub-loop monitoring circuit 603 detects this abnormality by, for example, the parity checking. The abnormality deteaction signal is not supplied from the circuit 601. The circuit 603 operates the switch 605 to enable the transmission of the synchronization cancellation signal from the portion 606. The synchronization-cancellation signal is delivered to the main loop through the switch 604.

After that, the circuit 603 operates the switch 604 to close the movable contact c with the fixed contact a. Thus, the sub-loop lj(1) is bypassed.

(3) With regard to junction box circuits downstream of the junction box circuit 6j, no failures exist in the sub-loops connected with the downstream junction box circuits. Reception and sub-loop monitoring circuits connected with the downstream junction box circuits do not carry out the specific control. Nodes in the sub-loops connected with the downstream junction box circuits are once brought to the asynchronization state. Then, the next frame synchronization signal is detected. Hence, the synchronization state is restored, and the reception and transmission of data at the nodes in the sub-loops connected with the downstream junction box circuits can be carried out.

(4) The synchronization cancellation signal is received by the supervisory device 2. The received frame detection portion 27 detects this synchronization cancellation signal and stops writing of data to the FBM 24 until the detection of the next frame synchronization signal (FP), so that the synchronization cancellation signal is eliminated. Even if the data in FBM 24 becomes empty, new frames can be delivered from the frame synchronization signal generation portion 25 to the main loop.

(5) The failure in the sub-loop which has been bypassed is eliminated. The reception and sub-loop monitoring circuit 603 detects the absence of failure and controls the switch 604 to turn the movable contact c from the fixed contact a to the fixed contact b. The synchronization cancellation signal is delivered through the contact between the fixed contact a and the movable contact c from the synchronization cancellation pattern generation portion 606.

After that, the switch 605 is controlled by the circuit 603 to turn the movable contact c to close with the fixed contact b. Thus, the sub-loop lj(1) is taken into the main loop 100. An operation similar to the operation described in (3) above is carried out in the junction box circuits and node downstream of the junction box circuit 6j. An operation similar to the operation described in (4) above is carried out in the supervisory device 2, so that the synchronization cancellation signal is eliminated.

It is possible to facilitate the decision required for control by receiving the information concerning the turning-on of the power source or the turning-off of the power source from the node through separate transmission lines, instead of relying on operation of the reception and sub-loop monitoring circuit in which the state of sub-loop lj(1) is monitored by the signal on the sub-loop lj(1) as in the above-described case.

Also, it is possible to deal in the similar manner with a failure in a node on the main-loop as with a failure in a node in the sub-loop as described above.

As a manner for embodying the present invention, a method for adjusting the amount of the frame buffer in a loop transmission system with frame synchronization control will be described with reference to FIGS. 10A to 10H.

In this method, the frames are constituted such that a predetermined reception-only frame is provided after a bypassing of a sub-loop occurs. This reception-only frame is eliminated after one circulation of this frame through the transmission loop. According to this method, the buffer amount of a frame buffer memory in the supervisory means is maintained less than one frame length.

In this method, a loop transmission system including a supervisory device and nodes is used, bypass operations are carried out by using a dummy frame generated in the supervisory device, and the dummy frame is eliminated by the supervisory device after the bypass operation is completed. When the buffer amount of a frame buffer memory in the supervisory device becomes greater than one frame length, the first frame after the completion of the above-mentioned bypassing is delivered as a reception-only frame. The delivered reception-only frame circulates through the transmission loop. After one circulation through the transmission loop, this delivered reception-only frame is eliminated. Hence, the buffer amount of the frame buffer memory in the supervisory device is adjusted not to exceed one frame length.

The processes of this method are illustrated in FIGS. 10A to 10H.

In each of FIGS. 10A to 10H, there is shown a model of the system including a supervisory device having an FBM, a main loop, a junction box circuit, and a sub-loop. For simplification, only one junction box circuit is shown, and nodes on the main-loop and sub-loop are not shown.

Figure 10A:
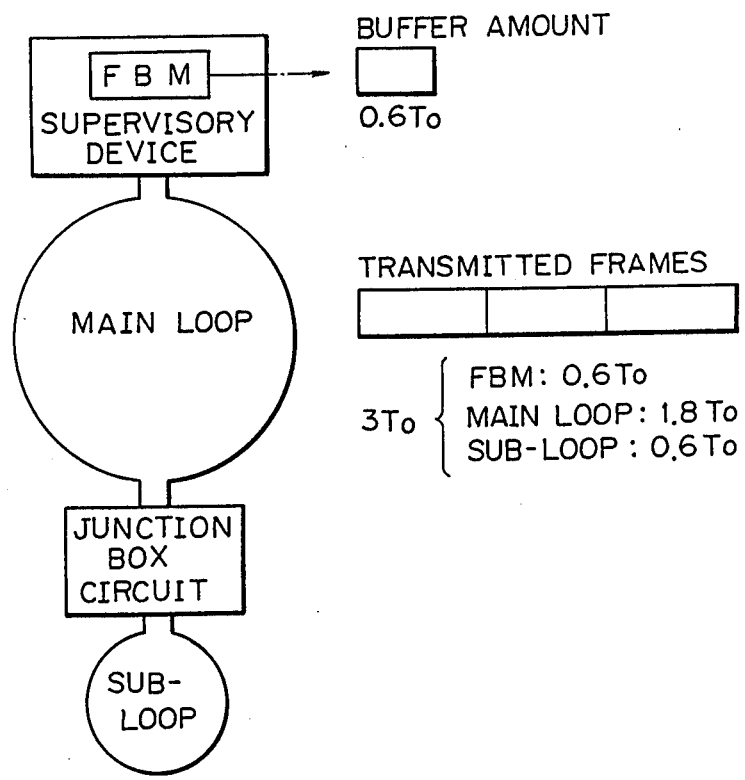
FIGS. 10A to 10B illustrate the operation of a loop transmission system with frame synchronization control according to a further embodiment of the present invention where the buffer amount of a buffer memory in a supervisory device in the loop transmission system is adjusted.
Figure 10B:
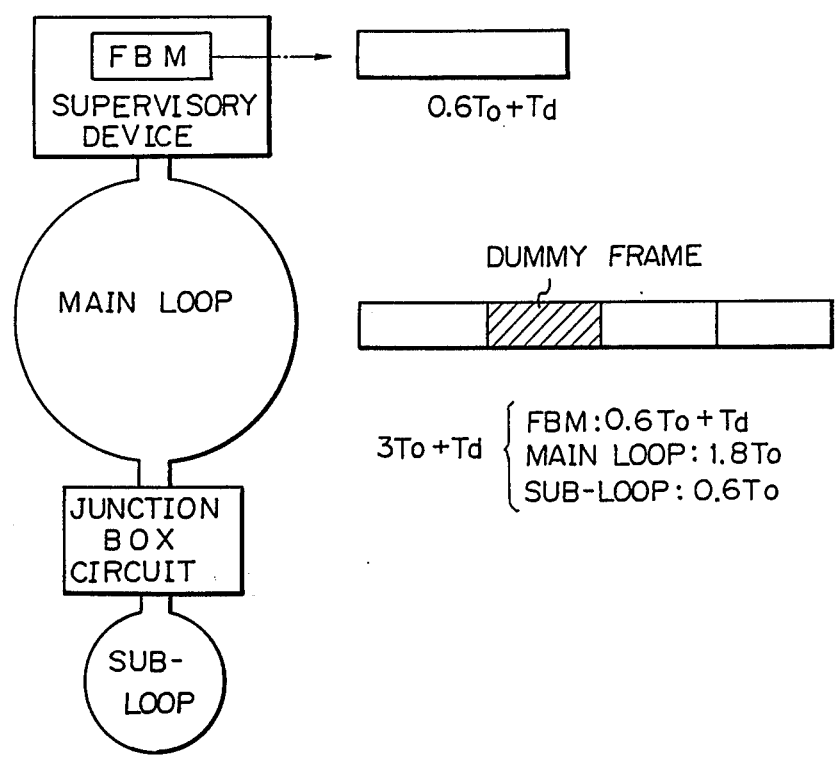
Figure 10C:
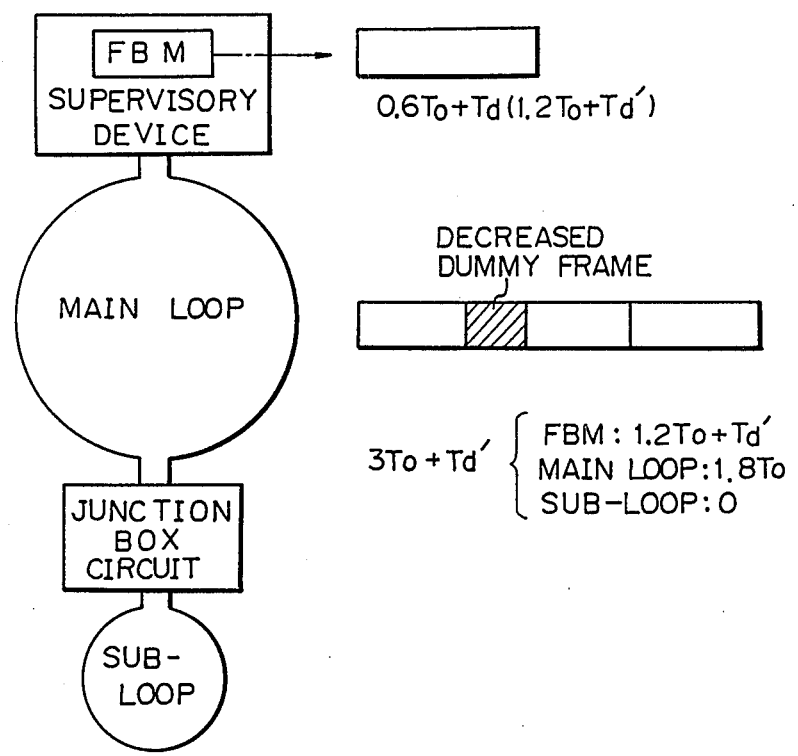

As process-1, the initial state is illustrated in FIG. 10A. As process-2, the state where a dummy frame is delivered is illustrated in FIG. 10B. As process-3, the state where a sub-loop in question is bypassed and the power source of a node in question is turned off is illustrated in FIG. 10C.

Figure 10D:
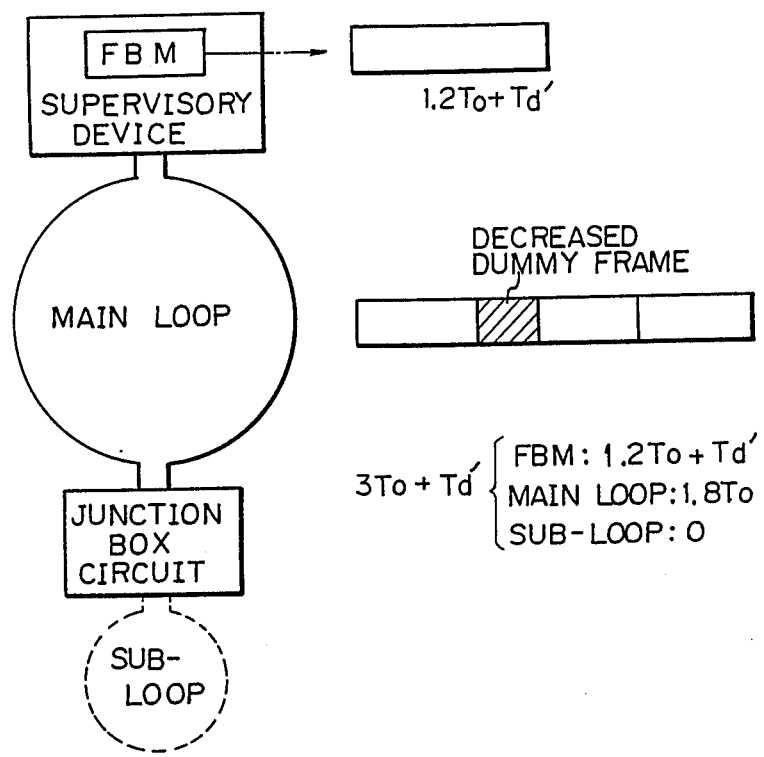
Figure 10E:
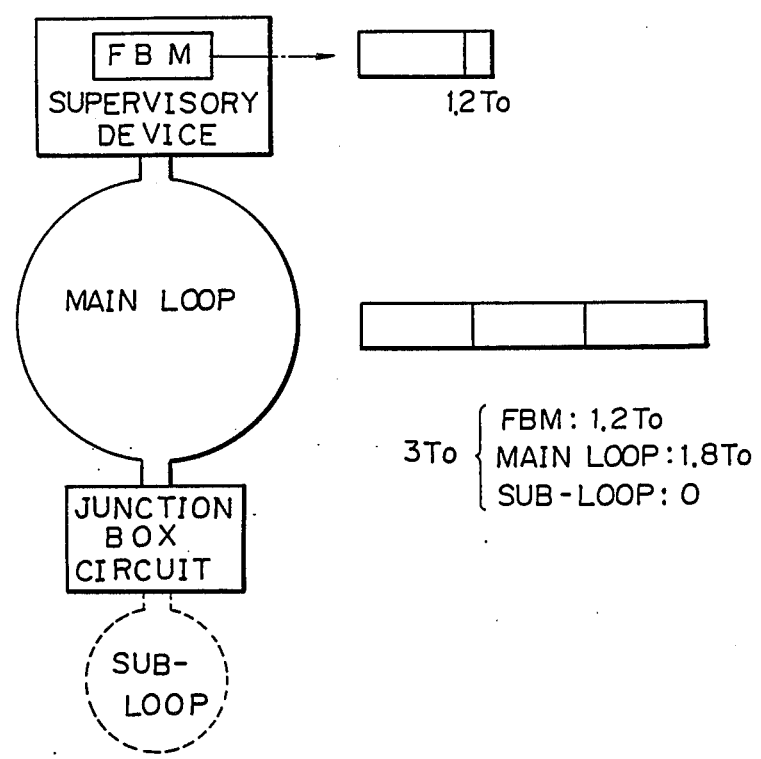

As process-4, the state where a sub-loop in question is bypassed and the buffer amount of the FBM is increased is illustrated in FIG. 10D. As process-5, the state where the dummy frame is eliminated is illustrated in FIG. 10E.

Figure 10F:
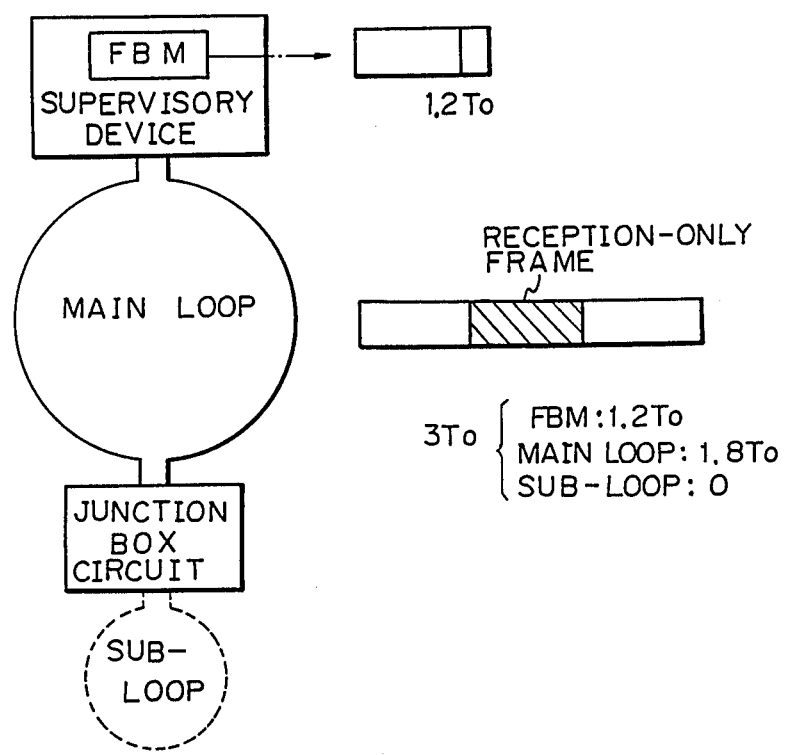
Figure 10:
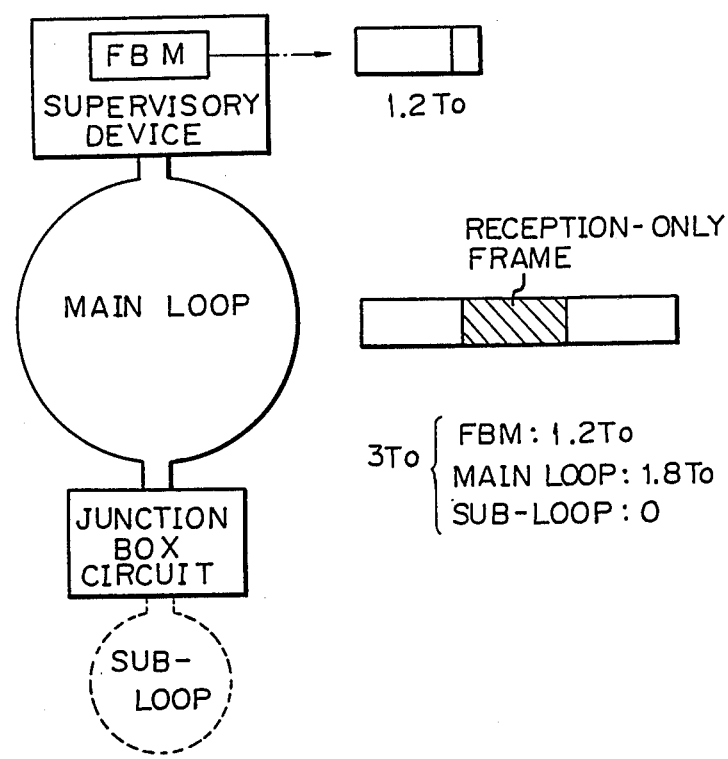
Figure 10H:
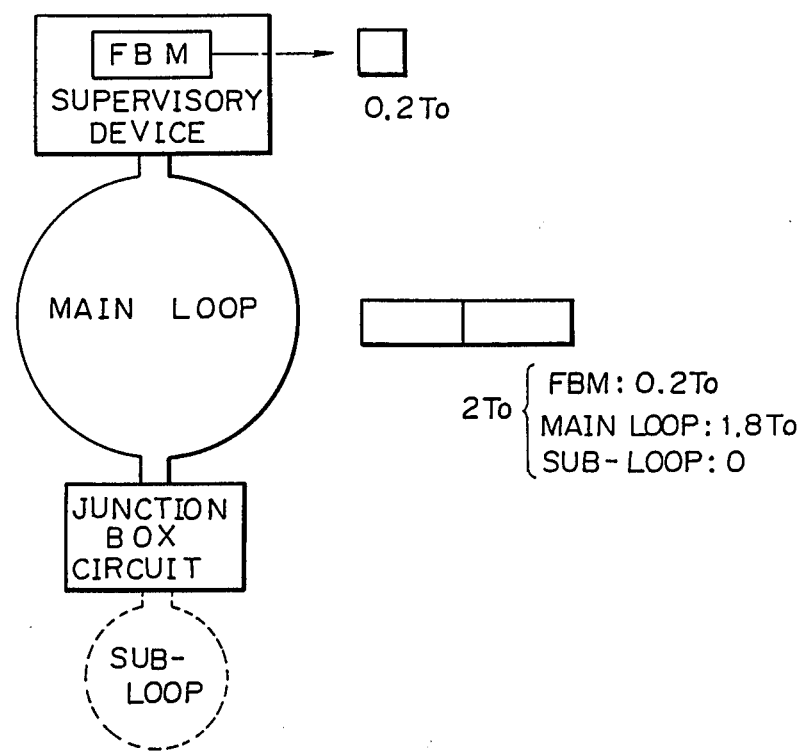

As process-6, the state where an excess beyond one frame length in the FBM is detected and the delivery of a reception-only frame is instructed is illustrated in FIG. 10F. As process-7, the state where the reception-only frame is circulated once through the transmission loop is illustrated in FIG. 10G. As process-8, the state where the reception-only frame is eliminated after the one-time circulation of the reception-only frame through the transmission loop is illustrated in FIG. 10H.

According to the manner described with reference to FIGS. 10A to 10H, the buffer amount of the FBM is maintained within the range from 0 to one frame length, and, accordingly, the capacity of the FBM can be saved.

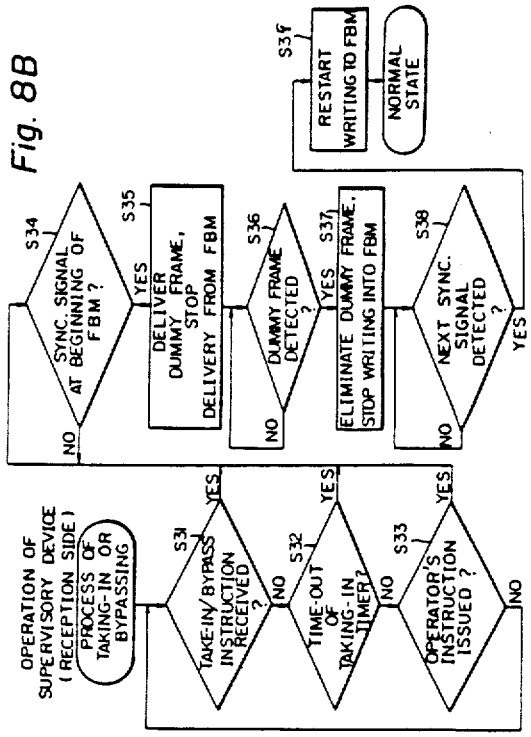

What is claimed is:

1. A loop transmission system with frame synchronization control, comprising:

loop means for transmitting information therethrough in a sequence of frames;

supervisory means inserted at a predetermined position in said loop means for supervising transmission of the information through said loop means and for delivering a frame synchronization cancellation signal in response to an instruction requesting a check on node status; and a plurality of node means, inserted at predetermined positions in said loop means, for receiving and delivering the information, for detecting the frame synchronization cancellation signal and canceling a synchronized operation state in response thereto, and for restoring synchronization beginning with a frame immediately following each synchronization cancelled frame, said system thereby providing quick restoration of synchronization after bypassing or taking-in of one of said node means.

2. A system according to claim 1, wherein one of said node means executes one of bypassing and taking-in when said frame synchronization cancellation signal is detected.

3. A system according to claim 1, at least one of said node means is installed in a sub-loop coupled with a main loop of said loop means through a junction box circuit.

4. A system according to claim 3, wherein said junction box circuit comprises means for delivering a synchronization cancellation signal.

5. A system according to claim 3, wherein said supervisory means comprises:

a frame buffer for storing a frame signal having a frame length;

means for generating a predetermined reception-only frame to carry out information reception exclusively, after bypassing of the sub-loop occurs;

means for eliminating the reception-only frame after one circulation through said loop means; and means for adjusting the frame length of the frame signal in said frame buffer memory.

6. A system according to claim 1, wherein said supervisory means includes means for generating a dummy frame, having a duration, following the synchronization cancellation signal.

7. A system according to claim 6, wherein bypassing of one of said node means is performed within the duration of the dummy frame signal.

8. A system according to claim 6, wherein each of said node means includes dummy frame detection means for detecting the dummy frame.

9. A system according to claim 6, wherein said supervisory means includes means for eliminating the from the data transmitted through said loop means after one circulation of the dummy frame through said loop means.

10. A system according to claim 1, wherein said supervisory means comprises:

a frame buffer for storing a frame signal having a frame length;

means for generating a predetermined reception-only frame to carry out information reception exclusively, after bypassing of at least one of said node means occurs;

means for eliminating the reception-only frame after one circulation through said loop means; and means for adjusting the frame length of the frame signal in said frame buffer memory.

* * * * *

UNITED STATES PATENT AND TRADEMARK OFFICE
CERTIFICATE OF CORRECTION

PATENT NO. : 4,779,087

DATED : October 18, 1988

INVENTOR(S) : HARUKI FUKUDA et al.

It is certified that error appears in the above-identified patent and that said Letters Patent is hereby corrected as shown below:

Front page, [75], line 3, "Tomohiki" should be --Tomohiko--
          [30], line 3, "Feb. 13, 1986" should be --Feb. 13, 1985--.

<u>In The Drawings</u>

FIGS. 7, 8A and 8B, the reference numerals should be included as indicated on the following sheets.

| | | |
|---|---|---|
| Column 1, | line 54, | "signal" should be --signal.--. |
| Column 3, | line 54, | "10B" should be --10H--. |
| Column 10, | line 3, | "throgh" should be --through--. |
| Column 11, | line 34, | "1k(1)" should be --1j(1)--; |
| | line 51, | "abovemen" should be --above-men--. |
| Column 12, | line 15, | "ba" should be --be--. |
| Column 14, | line 48, | "reception-only" should be --reception-only--; |
| | line 63, | "the from" should be --the dummy frame from--. |

Signed and Sealed this

Eighteenth Day of April, 1989

Attest:

DONALD J. QUIGG

Attesting Officer      Commissioner of Patents and Trademarks

UNITED STATES PATENT AND TRADEMARK OFFICE
CERTIFICATE OF CORRECTION

PATENT NO. : 4,779,087

DATED : October 18, 1988

INVENTOR(S) : HARUKI FUKUDA et al.

It is certified that error appears in the above-identified patent and that said Letters Patent is hereby corrected as shown below:

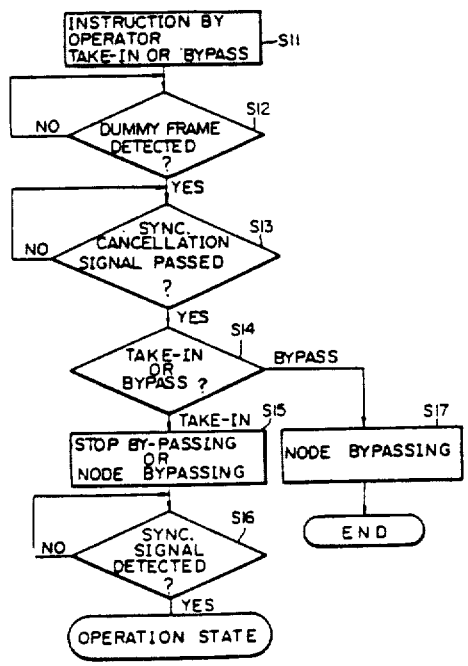

UNITED STATES PATENT AND TRADEMARK OFFICE
CERTIFICATE OF CORRECTION

PATENT NO. : 4,779,087

DATED : October 18, 1988

INVENTOR(S) : HARUKI FUKUDA et al.

It is certified that error appears in the above-identified patent and that said Letters Patent is hereby corrected as shown below:

16/29

*Fig. 8A*

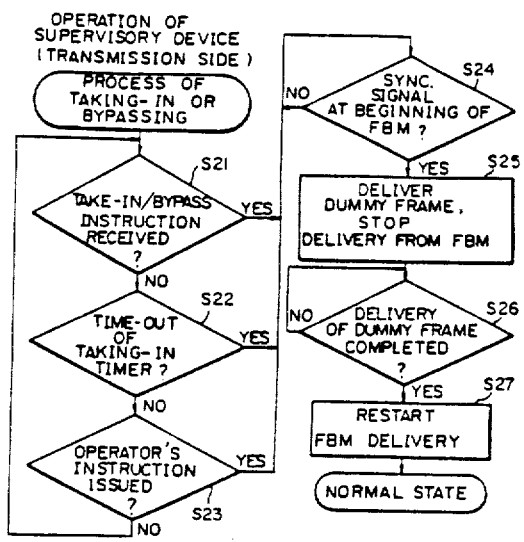

UNITED STATES PATENT AND TRADEMARK OFFICE
CERTIFICATE OF CORRECTION

PATENT NO. : 4,779,087

DATED : October 18, 1988

INVENTOR(S) : HARUKI FUKUDA et al.

It is certified that error appears in the above-identified patent and that said Letters Patent is hereby corrected as shown below: